Figure 1:
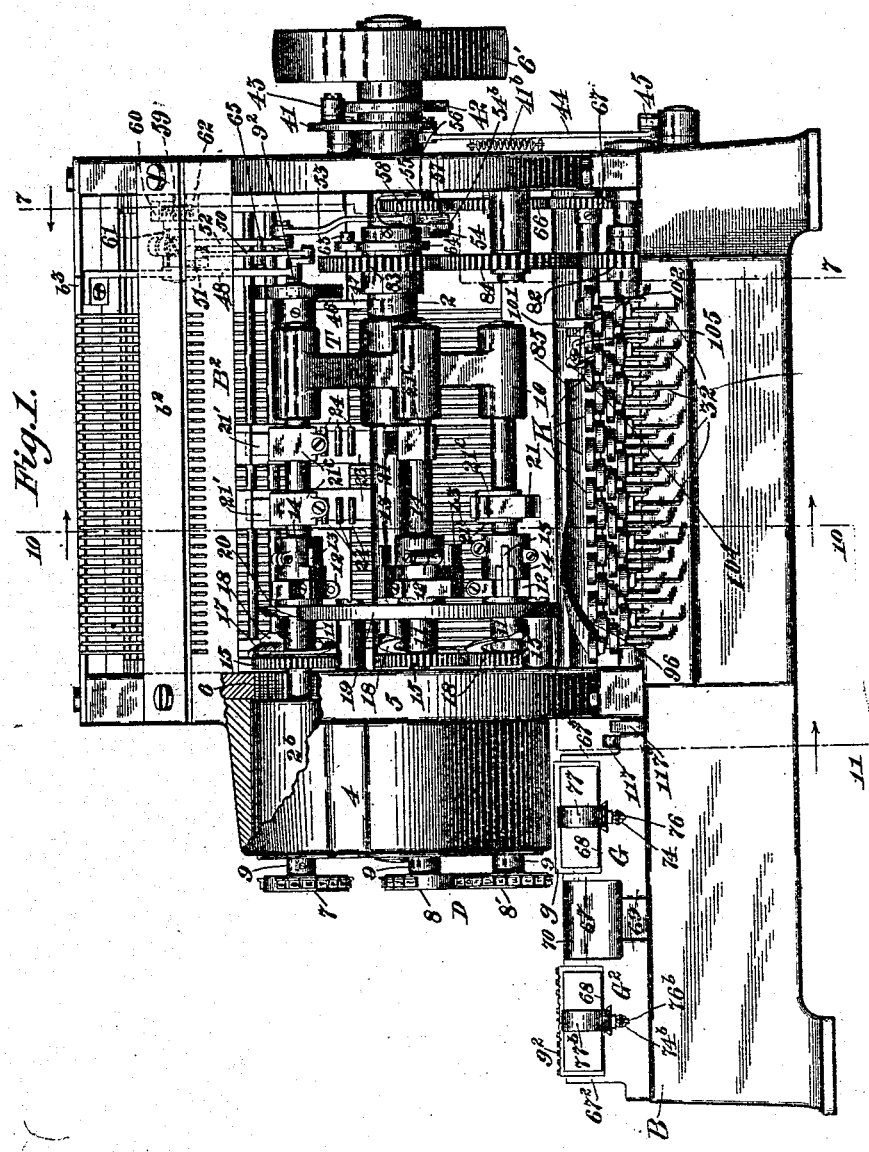

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 1.

Witnesses.

Inventor.

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 3.

Witnesses:
Inventor,

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 4.

Witnesses:
H. C. Abbott
F. W. Harland

Inventor,
F. H. Richards.

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 5.

Witnesses:
Inventor:

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 6.

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 7.

Witnesses:

Inventor;

F. H. RICHARDS.
MACHINE FOR MAKING TYPE AND TYPE BARS.
APPLICATION FILED FEB. 28, 1901.

911,612.

Patented Feb. 9, 1909.
12 SHEETS—SHEET 8.

Witnesses:
W. C. Abbott
F. H. Nailand

Inventor,
F. H. Richards.

F. H. RICHARDS.
MACHINE FOR MAKING TYPE AND TYPE BARS.
APPLICATION FILED FEB. 28, 1901.

No. 911,612.

Patented Feb. 9, 1909.
12 SHEETS—SHEET 9.

Fig. 10.

Witnesses:
A. B. Mattingly
F. W. Nailand

Inventor
F. H. Richards

F. H. RICHARDS.
MACHINE FOR MAKING TYPE AND TYPE BARS.
APPLICATION FILED FEB. 28, 1901.
911,612.
Patented Feb. 9, 1909.
12 SHEETS—SHEET 10.
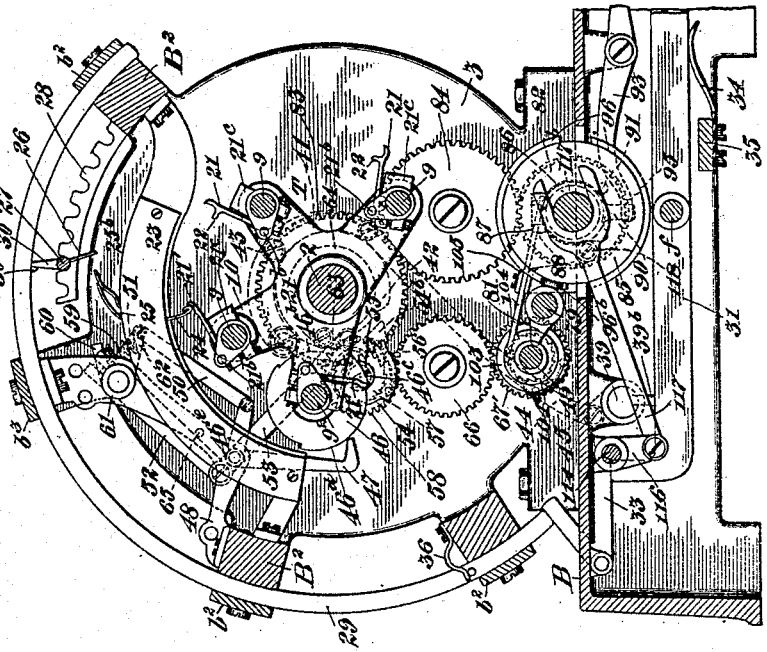
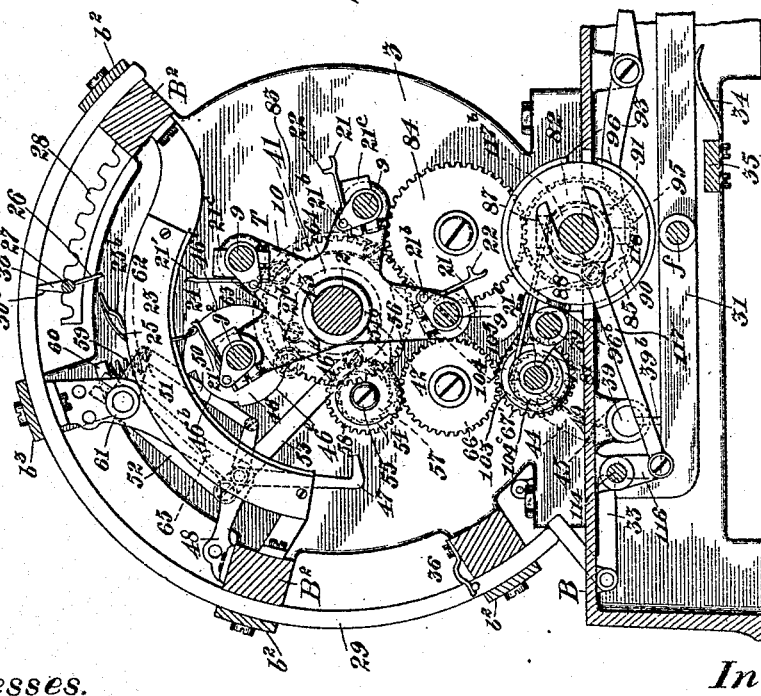
Witnesses.
A. B. Mattingly
F. W. Norland
Inventor.
F. H. Richards.

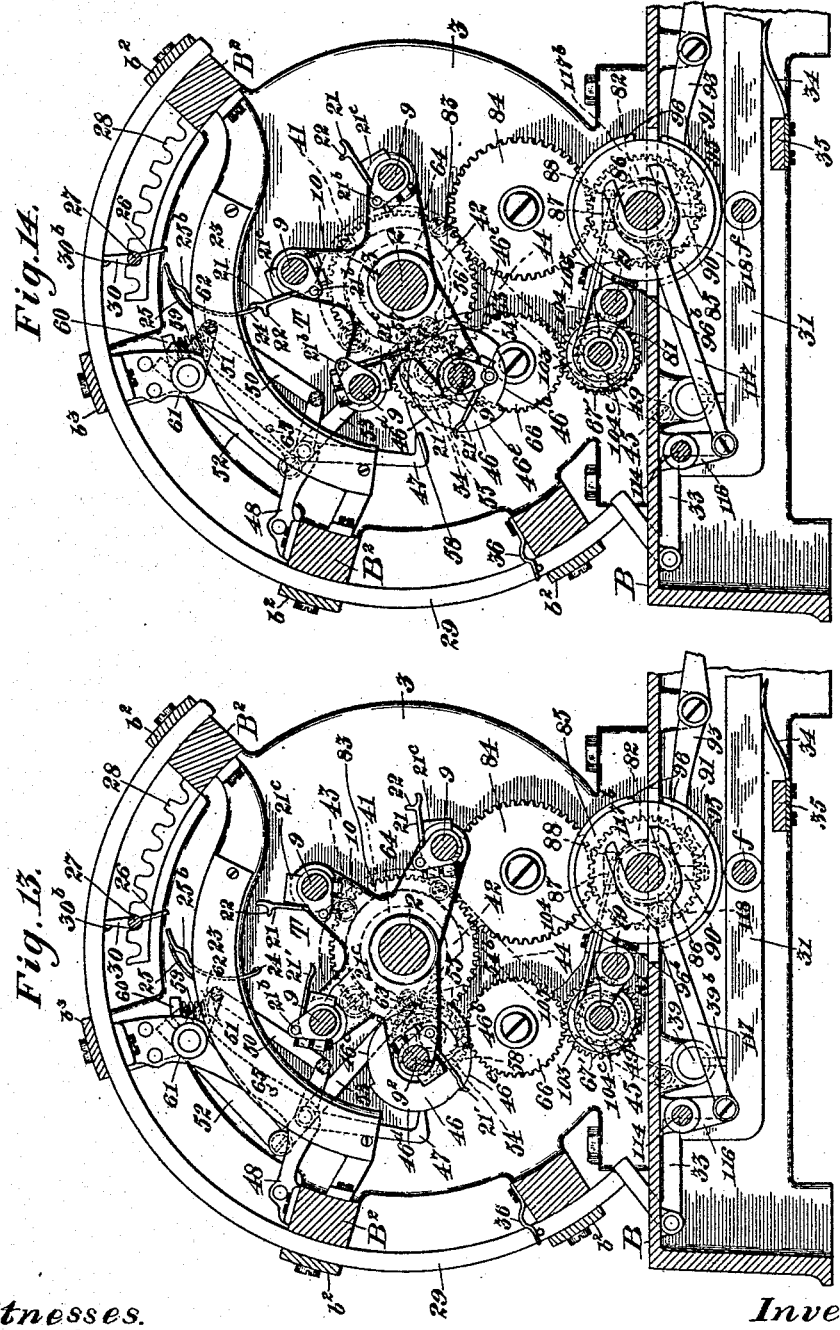

F. H. RICHARDS.
MACHINE FOR MAKING TYPE AND TYPE BARS.
APPLICATION FILED FEB. 28, 1901.
911,612.
Patented Feb. 9, 1909.
12 SHEETS—SHEET 12.
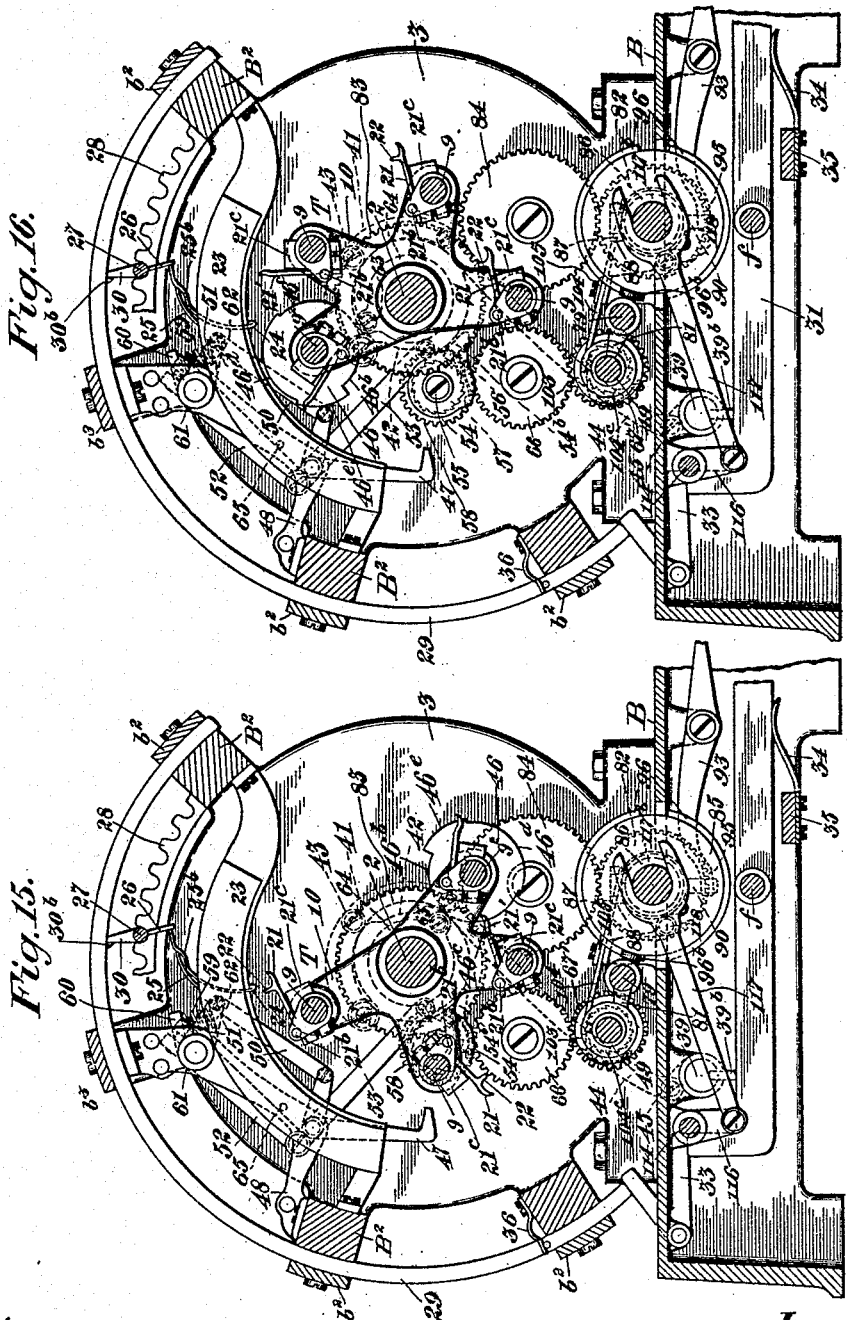
Witnesses
A. B. Mattingly
F. W. Harland
Inventor
F. H. Richards

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

MACHINE FOR MAKING TYPE AND TYPE-BARS.

No. 911,612.     Specification of Letters Patent.     Patented Feb. 9, 1909.

Application filed February 28, 1901. Serial No. 49,311.

*To all whom it may concern:*

Be it known that I, FRANCIS H. RICHARDS, a citizen of the United States, residing at Hartford, in the county of Hartford and State of Connecticut, have invented certain new and useful Improvements in Machines for Making Types and Type-Bars, of which the following is a specification.

This invention relates to machines for making types and typebars, and pertains more particularly to that class of such machines adapted to form types upon typebar-blanks by means of dies or die-like instrumentalities.

This invention has for an object to provide a machine of this character in which a completed and finished type results from the successive action of two or more type-forming dies, for instance, a roughing or blocking-out die operating in advance of a finishing die.

It is an object also of the present invention to provide a typebar machine in which any one of a number of dies conveyed periodically past the type-forming point may be caused to operate thereat by a rolling action, that is to say, which forms a type as the result of a cycloidal movement of one or more dies with respect to the type surface.

A machine embodying the present invention is illustrated in the drawings which accompany the following specification.

Figure 2:
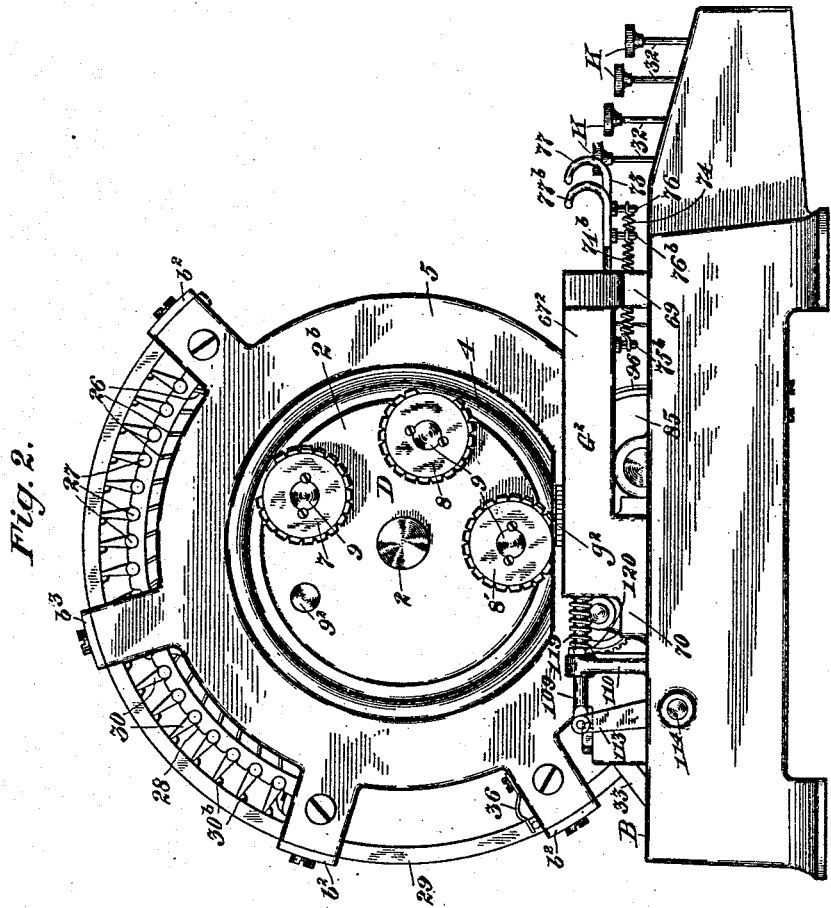
Figure 3:
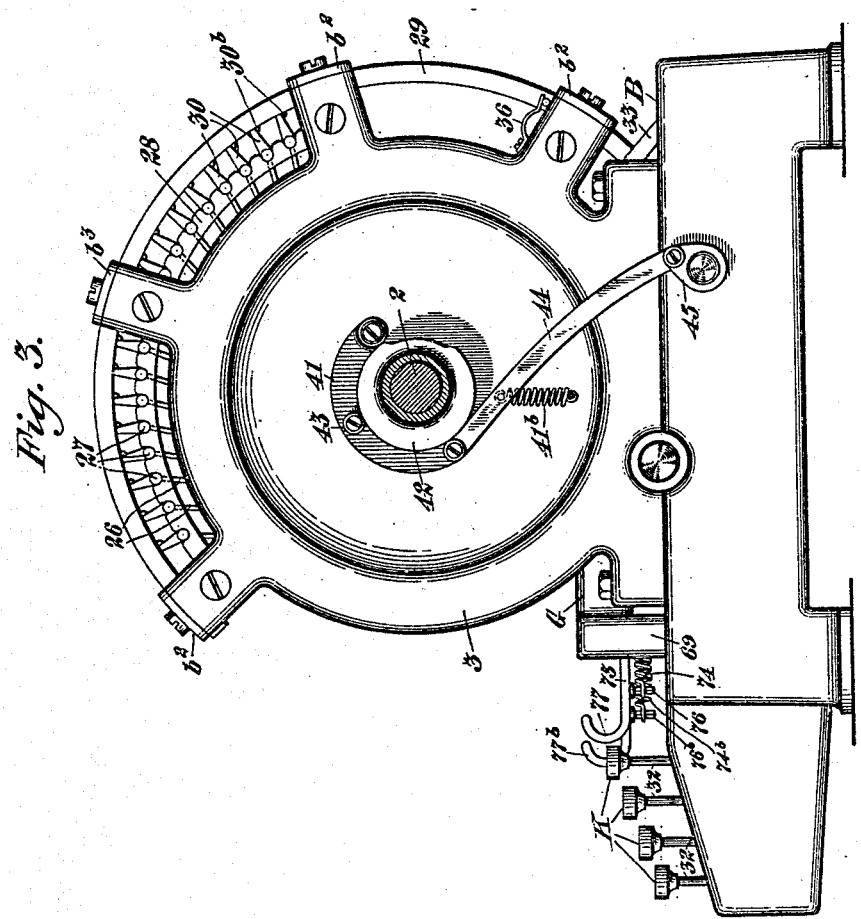
Figure 4:
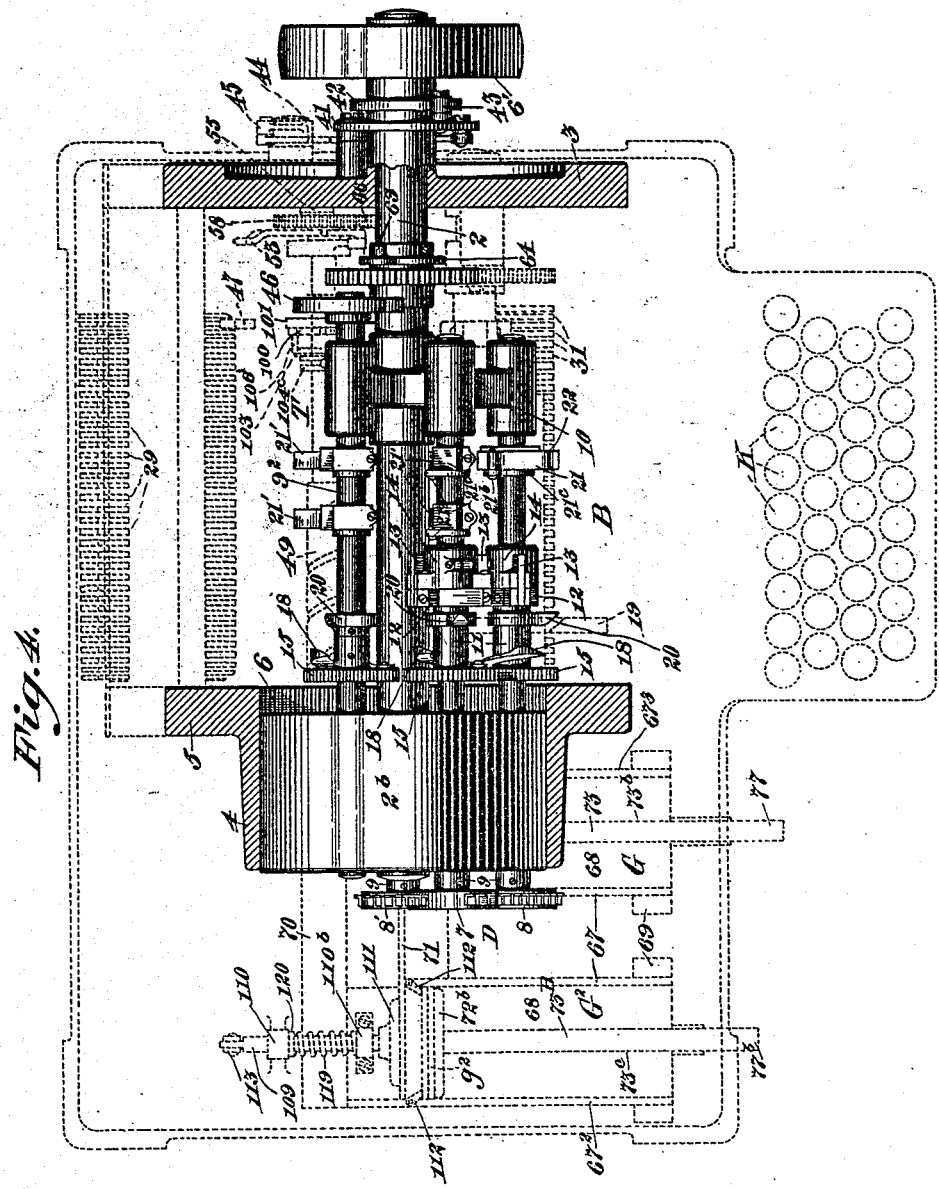
Figure 5:
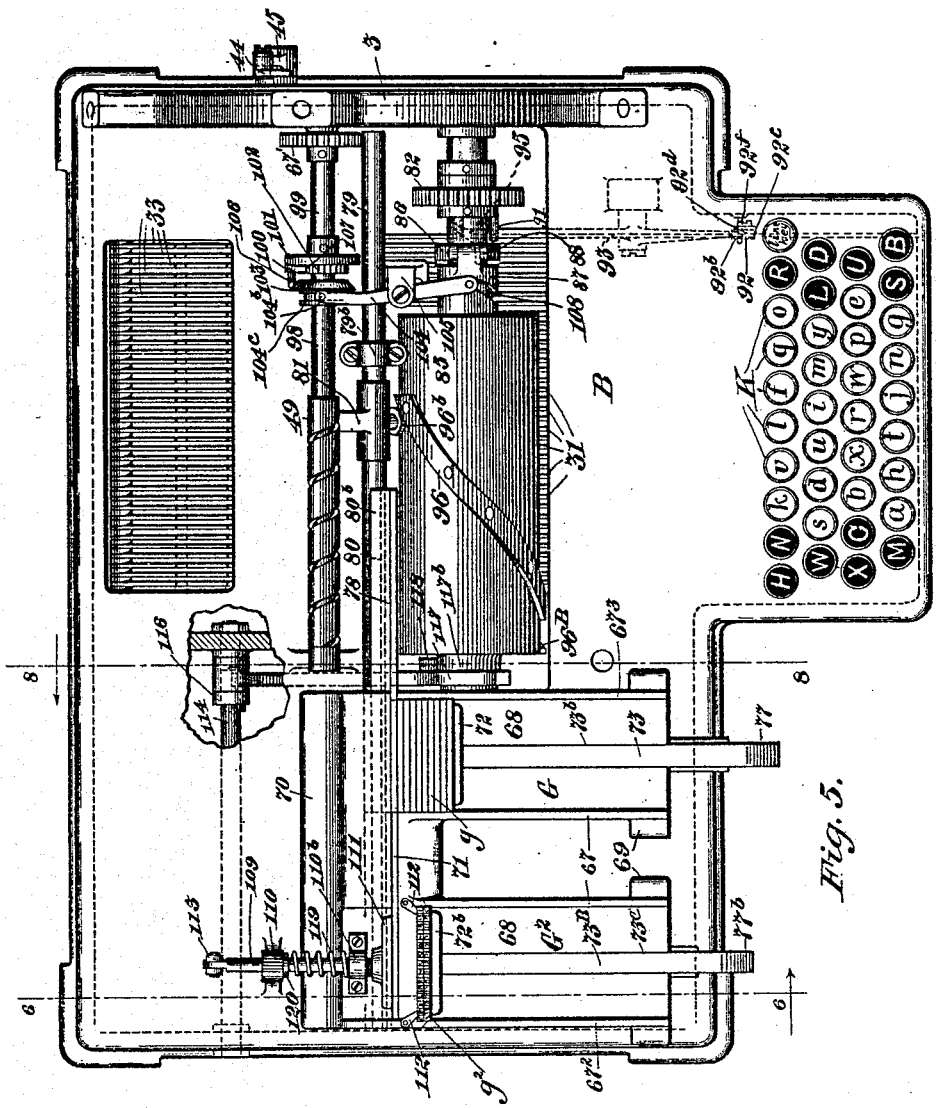
Figure 6:
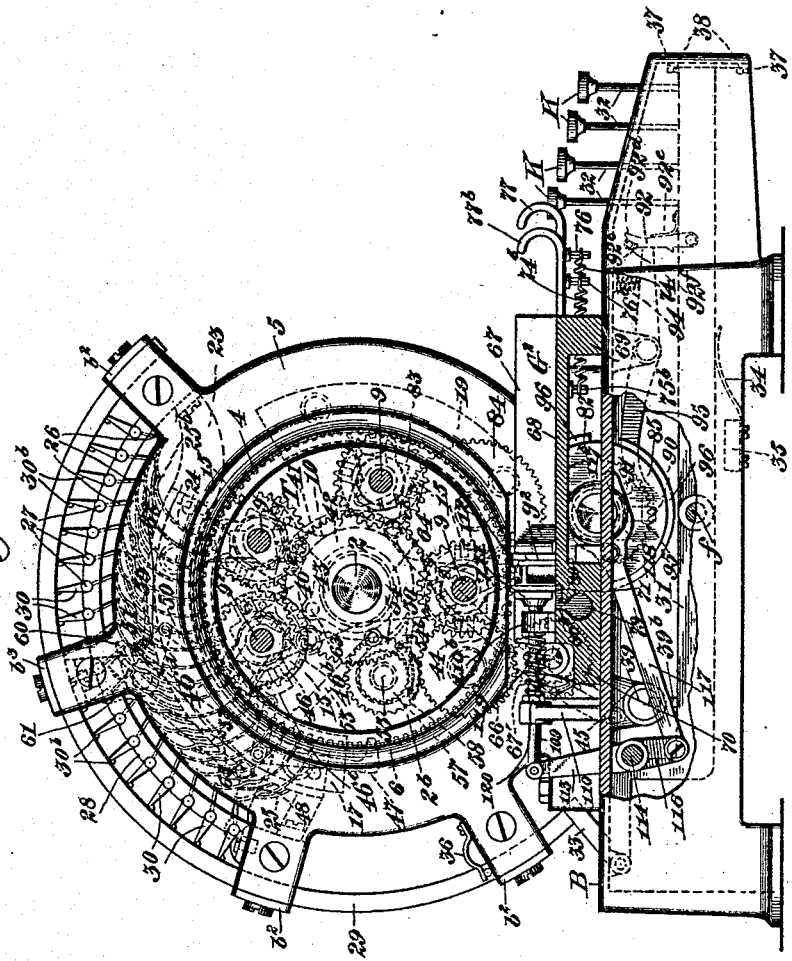
Figure 7:
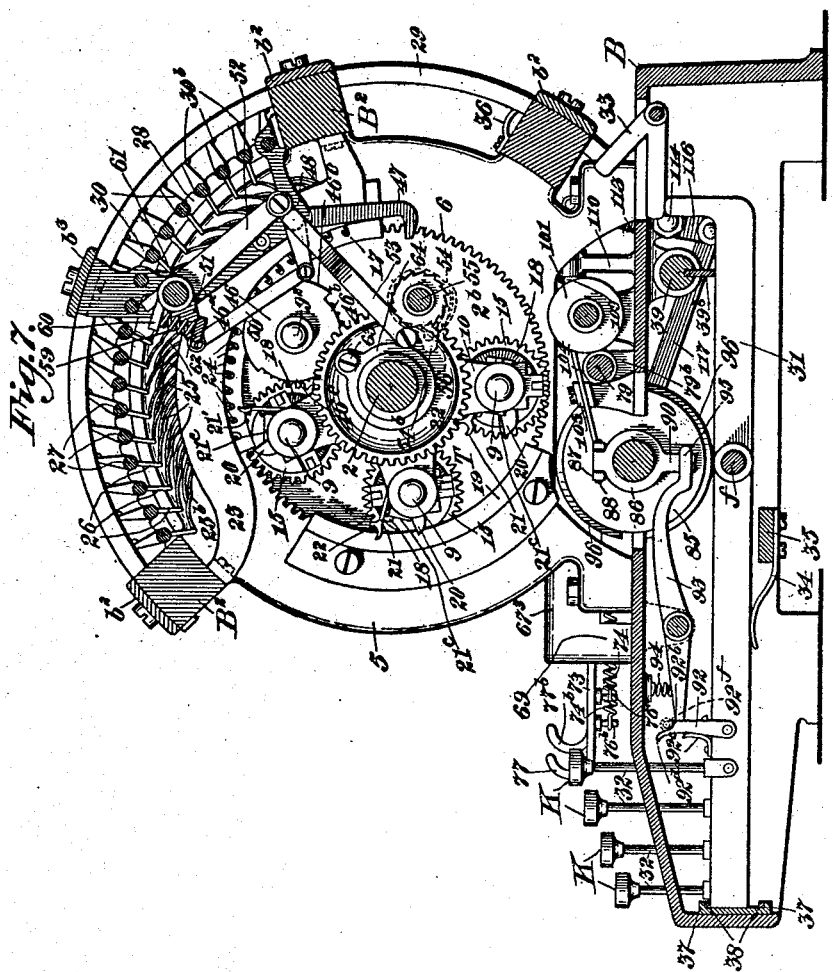
Figure 8:
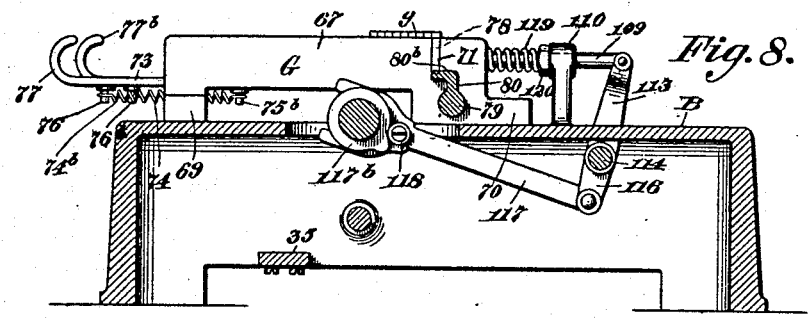
Figure 9:
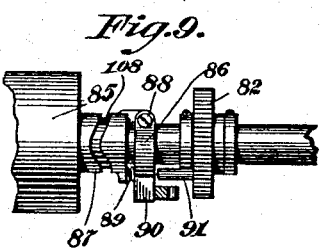
Figure 17:
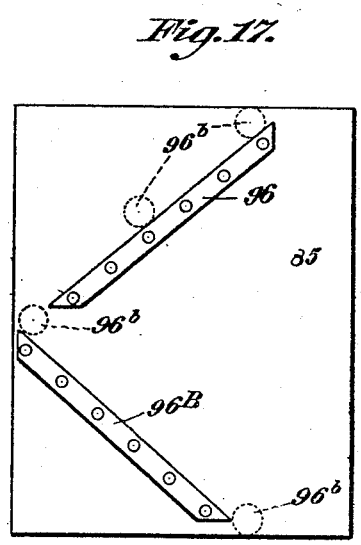
Figure 18:
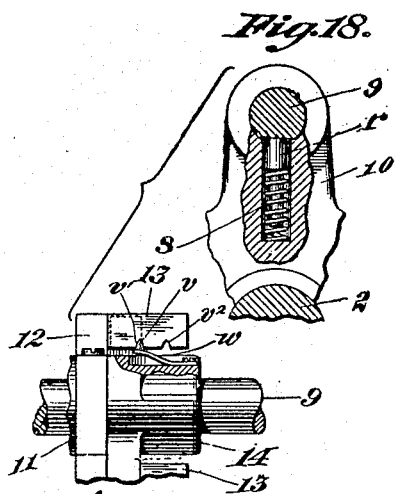

In these drawings, Figure 1 is a front elevation of such a machine, a portion being broken away and part being shown in section. Fig. 2 is an end elevation thereof looking toward that end of the machine at which the type-forming dies are located. Fig. 3 is an elevation of the opposite end of the machine with the driving pulley shown in Fig. 1 removed. Fig. 4 is a plan view of certain of the turret mechanism, such view being taken with the turret in the position shown in Fig. 1. Fig. 5 is a plan view of the machine with one side frame removed and the turret, and latch mechanisms removed, part also being broken away. Fig. 6 is in part a transverse vertical section on the plane of the line 6—6 in Fig. 5, and looking in the direction of the arrow in that figure. Fig. 7 is a transverse vertical section on the plane of the broken line 7—7 in Fig. 1, looking in the direction of the arrow in the latter figure. Fig. 8 is a transverse vertical section on the plane of the line 8—8 in Fig. 5, looking toward the left-hand in that figure. Fig. 9 is a view of a detail on an enlarged scale. Fig. 10 is a transverse vertical section on the plane of the line 10—10 in Fig. 1, looking in the direction of the arrow. Figs. 11, 12, 13, 14, 15 and 16 are similar sections on the plane of the broken line 10—11 in Fig. 1. looking toward the right-hand in that figure; certain portions are omitted in these figures. Fig. 11 shows the parts in a position in which a starting-arm on the feed-wheel shaft has contacted with and been actuated by a projected latch. Fig. 12 is a view similar to Fig. 11, representing another step in the progressive movement of the parts, and shows the latter in a position in which a starting-arm on the roughing-die wheel shaft has contacted with and been actuated by the said projected latch. Fig. 13 represents the feed-wheel in contact with the feed-arm. Fig. 14 represents still another position of the parts, in which the starting-arm on a finishing-die wheel shaft has contacted with the said projected latch. Figs. 15 and 16 represent, respectively, corresponding positions assumed by the parts during the progressive movement of the turret. Fig. 17 is a development of the surface of a certain cam drum embodied in the machine, representing the cam rails thereon; and Fig. 18 is a view on an enlarged scale of a rotating part embodied in the machine and shows certain features designed to control the rotarial inoperative position of said part and its operative and inoperative axial positions.

Similar characters of reference designate corresponding parts in all the figures.

In carrying out my present invention the type-forming dies are conveyed periodically past the point at which a type is to be formed with the preliminary or blocking-out die in advance of the supplemental or finishing die. For the attainment of this periodic motion of the dies, they may be mounted upon a carrier, which may conveniently be a rotary carrier or turret as shown, designated generally herein by the letter T. The shaft 2 of this turret may extend horizontally, as indicated, and be journaled at one end in a bearing formed in or supported by an upright side frame 3 erected upon the base-frame B and constituting with the latter a portion of the machine frame. At the other end this shaft 2 is shown secured to a disk $2^b$ mounted in a bearing which may be formed in or supported by a casing or head 4 projecting laterally from an upright or side frame 5 in the direction of the shaft 2. A band-wheel or pulley-wheel 6' attached to the shaft 2 may be used for the purpose of rotating the turret from a suitable source of power.

The dies employed for the purpose of forming types, designated generally by B, may be of any suitable or desired construction; and where a number of type-forming dies are used, as in this instance, they may conveniently be located upon the peripheries of one or more wheels, as shown in the drawings, in which three die-wheels with attached dies are represented, a roughing die-wheel 7 and two finishing die-wheels 8 and 8'.

In providing a finishing-die to follow any particular roughing or blocking-out die it is plain on reflection that the same roughing-die may be appropriate for the preliminary preparation of blocks of type-formable material to be afterward individually operated upon by different finishing dies, since different types or type bodies may have substantially the same width. For instance, the portions or blocks upon which either of the letters X, B, H, &c., of the same font is to be formed, are substantially of the same dimensions, and hence the preliminary or blocking-out process may be performed by the same die whichever letter is to be subsequently formed on the block. With this explanation it is evident that a sufficient number of roughing dies may be mounted upon the periphery of a single die-wheel to act as a preparatory instrumentality for more dies than can be located upon a single finishing-die wheel; hence a single roughing-die wheel 7 may be used in connection with a plurality of finishing-die wheels 8 and 8', as shown.

Each of the die-wheels mentioned may be conveniently secured to an appropriate shaft 9, all of which shafts are severally rotatably mounted in the turret T, to enable any particular die to be brought to the type-forming point. The shafts 9 are so journaled in a spider 10 attached to the shaft 2, and at the other end in the disk $2^b$. As constructed in the present instance, the turret T may be regarded as made up of the spider 10, disk $2^b$, and the connecting shaft 2.

Rotation of a shaft 9 to bring the desired die D upon the die-wheel attached to the shaft to the type-forming point as the turret rotates may be effected in any suitable manner, or the mechanism illustrated herein may be adopted. As shown, this mechanism comprises a sleeve 11 movable longitudinally or lengthwise of each shaft 9, but compelling the latter to rotate with it by means of a collar 12, from which there projects one or more pins 13 adapted to slide endwise in corresponding guide-ways in a collar or other fixture 14 affixed to the shaft on which the sleeve is mounted.

Movement of each sleeve 11 in one direction serves to engage a gear-wheel 15 attached to the sleeve with a driver 6, here shown to be an internal gear-wheel. Disengagement of the gear-wheel is occasioned by a movement of the sleeve in the opposite direction. The former of these to-and-fro movements results, in the present instance, from the coaction of a fixed actuating member or cam 17, secured to a stationary portion of the machine with a coacting member or cam-arm 18, one for each sleeve 11, which moves in unison therewith. Each cam-arm 18 is shown to have its operative surface upon a resilient strip for the purpose of suppressing the violence of the shock due to the compact of the arm with the surface of cam 17 when moved to a point where coaction will occur.

Normally, that is when no die is operating or moving to an operative position, each cam-arm 18 will occupy a position such that it will not contact with the cam 17 during the rotation of turret T. When, however, a shaft 9 is set rotating upon its axis the sleeve 11 rotating in unison with it will at some period of its rotary and orbital movement swing the arm 18 into contact with the cam 17, whereupon the continued rotation of the shaft about its own axis and its revolution about the axis of the turret will cause the shifting of the sleeve 11 endwise and eventually the engagement of the gear-wheel 15 thereon with the driver 6. A positive rotation of the shaft will now ensue upon the further rotation of the turret.

A similar device may be used to return each sleeve 11 to its original or inoperative axial position and withdraw the gear-wheel 15 from engagement with the driver 6. It may consist, as here shown, of an oppositely-facing fixed actuating member or cam 19 secured to a stationary portion of the machine and a coacting member or cam-arm 20, projecting from each sleeve. The length of this fixed cam 19 and the relation of its position to that of the cam 17 is such that it will not operate to return a sleeve to its normal or inoperative position until after the operative die on the die-wheel attached to the shaft of that sleeve shall have completed its work, when by the continued rotation of the turret the arm 20 is brought into contact with the cam 19 and the sleeve is shifted backwardly in a manner similar to that already explained with reference to the cam 17 and cam-arm 18.

It is important for the correct operation of the machine that whenever a shaft 9 ceases rotating about its own axis that it shall come to rest in the same definite position each time. This is accomplished in the present instance by a device which I may term a precision brake, comprising, as shown in Fig. 18, a plunger $r$ adapted to move lengthwise in an opening in one of the arms of the spider 10. This plunger $r$ is pressed outward against the shaft by a spring $s$, and with a flattened or facet portion of which shaft the end of the plunger coöperates to bring the shaft to rest in a definite position.

The means illustrated in the drawings accompanying the present specification for initiating the rotation of each shaft 9 and for continuing the same until the gear-wheel 15 on the sleeve 11 encircling that shaft has meshed with the driver 6, comprises a starting-arm 21 extending from each of the finishing-die wheel shafts 9 and 9, and a starting-arm 21' on the roughing-die wheel shaft. Each starting-arm is shown secured to its shaft by a clamp $21^c$ on which the arm is resiliently mounted by a pin $21^b$. The construction of each of these starting-arms is such as to cause its coaction with a projected latch of a latch mechanism, a form of which will presently be described, and the construction and operation of the arm may be such as set forth in Patents Nos. 401,371, and 573,620, granted to me on April 16, 1889, and December 22, 1896, respectively, which may be consulted for a more detailed description. Suffice it here to say that the starting-arms 21 and 21 on the shafts 9 and 9 carrying the finishing-die wheels 8 and 8' are shown in different transverse planes and each provided with a resetting heel 22 for resetting the projected latch as set forth in said patents. The shaft carrying the roughing-die wheel 7, moreover, is shown provided with a starting-arm 21' in each of the planes in which the starting-arms on the other shafts are located, but, and for a reason that will appear presently, neither of these arms is provided with a resetting heel.

In the operation of the machine, each shaft 9 is given a definite amount of rotation from the commencement of such movement up to a fixed point, or the point where a die on the die-wheel of that shaft is to operate, and these amounts of rotative movement are different, though equally definite, for each different die. In other words, a shaft is started in rotation at different points in the circle of rotation of the turret according to the particular type which is to be formed. For the purpose of initiating this rotary movement, as aforesaid, a number of selective devices, (herein shown in the form of latch mechanism,) may be employed, which are disposed around the axis of rotation of the turret T. Each latch mechanism is provided with a latch adapted when disengaged to protrude into the path of the corresponding starting-arm. The various latch mechanisms for operating any single shaft 9 may be supported in a latch frame, while the latches are disposed in the same plane transverse to the shaft as the starting-arm with which they are designed to coöperate.

Fig. 18 shows certain means which may be used for retaining each sleeve in its two axial positions corresponding to the engaged and disengaged position of the gear-wheel 15 on the sleeve. As shown, it comprises a detent $v$ forced outward against one of the mentioned pins 13 extending axially from the sleeve by a spring $w$. This detent $v$ is adapted to engage with the notches or recesses $v'$, $v^2$ and hold the sleeve in the corresponding position as the latter assumes one axial position or the other.

Referring to the particular construction set forth in the accompanying drawings, each latch-frame 23 is secured to cross-bars $B^2$, extending between the machine frame uprights 3 and 5. Through openings in the latch frame pass the latches 24, which may correspond in number to the number of dies upon that die-wheel whose shaft 9 they are designed to operate. The latches 24 are shown to have the form of curved rods, and to be each held in its normal or retracted position by a spring 25, which bears against the side of a depression $25^b$ in the body of the latch, when the latch is withdrawn from the path of the starting-arm, while the spring slides upward out of the depression when the latch is forced inward by a finger 26 extending from a rock-shaft 27 mounted in suitable bearings 28 attached to the end frames 3 and 5.

There is a seperate rock-shaft 27 for each latch 24 in the set disposed around the turret axis which contains the greater number, and from each shaft motion is communicated to a latch in any set to effect the tripping thereof by a finger 26.

For the purpose of rocking any individual shaft 27 in its bearings an actuator 29 is supplied operative from the key-board of the machine. Preferably the construction will be such as to enable any particular rock-shaft 27 to be placed in operative connection with a particular actuator. To this end each actuator may consist of an elongated curved rod extending transversely to the rock-shafts 27 and from one side of the set of shafts to the other. These curved actuators may be guided in suitable slots formed in the cross-bars $B^2$ and held therein by cap plates $b^2$. An additional slotted guide $b^3$ is also shown.

Extending from each shaft 27 is an arm 30 adapted to coact with a shoulder $30^b$ on that actuator 29 which is designed to operate that particular shaft. By affixing an arm 30 to any particular shaft 27 in such a position as to coact with a shoulder $30^b$ upon any particular actuator 29, it is manifest that any desired shaft, and hence any desired latch 24, may be operated from a given actuator.

Each actuator 29 is combined with a device for its convenient operation, which device is here shown as comprising in each instance a rock-lever 31, fulcrumed intermediate its ends, (see $f$,) and carrying at that end adjacent to the front of the machine a push-rod 32, surmounted by a marked finger-piece or key, designated generally by K. At the opposite end each lever 31 transmits its motion to an actuator 29 through an interposed angle-lever 33, (see particularly Fig. 10.) Each lever 31 may be provided with a return spring 34 secured to a cross-piece 35, and each actuator 29 with a returning spring 36 to insure the normal positioning of the parts following their actuation, while the play of the several levers 31 may be limited by shoulders 37, which may, if desired, be covered with some yielding substance marked 38, to receive the impact of the moving lever.

Since the proper procedure in the operation of the machine requires the roughing-die upon the roughing-die wheel 7 to operate in advance of the corresponding finishing-die upon the die-wheel 8 or 8′, it is essential that when a latch 24 has been projected as a result of depressing a key K that a starting-arm on the roughing-die wheel shaft 9 shall engage with the latch before the starting-arm on the finishing-die wheel shaft, as otherwise a finishing-die might be brought to the operative or type-forming point before a roughing-die has prepared or blocked out that portion of the die blank on which the finishing-die is intended to operate. To preclude, therefore, an incorrect order of operation of the dies, the keys K on the keyboard are, in the present illustrated embodiment, locked during the entire rotation of the turret T, except for that portion at least of such period represented by the angular movement of the turret from a position in which the starting-arm 21 on the shaft 9 of the last finishing-die wheel 8′ has just passed out of possible engagement with any latch 24 in the series in its plane to a position in which either of the starting-arms 21′, 21′ on the shaft of the roughing-die wheel can engage with the first latch in its corresponding frame if the same be projected while the starting-arm is advancing toward it. If during this portion of the turret rotation a latch 24 is projected, it is evident that the first starting-arm to contact with it will be one of those on the roughing-die wheel shaft, and since, as before stated, neither of these starting-arms is provided with a resetting heel, the latch will remain in its projected position even though the shaft has been swung around and set in rotation, as already pointed out. Further movement of the turret will bring the starting-arm 21 on a finishing-die wheel shaft into contact with this same latch and result in an identical amount of rotation of the latter shaft, whereby both the roughing and the corresponding finishing-die will operate to complete the same type upon the typebar-blank.

The locking of the levers 31, before referred to, may be accomplished by means of a rock-shaft 39 extending transversely across the set of levers and provided with a longitudinal locking flange $39^b$ adapted to restrict or prevent the movement of any lever 31, when the shaft 39 is rocked into the position indicated in Figs. 11, 15, and 16, for instance. This shaft 39 may be turned into this position by means of a vibrating arm 41 pivoted to the side frame 3 and adapted to be swung upon its pivot by means of a cam 42 attached to the turret shaft 2 and bearing against a cam roller 43 mounted upon the vibrating arm. The arm 41 is connected, in the present instance, by means of a link 44 to an arm 45 attached to and extending from the rock-shaft 39. A spring $41^b$ may be supplied for keeping the roller 43 in contact with the cam 42. In assembling the various parts of the machine the depression in this cam 42 will be so related to the different shafts 9 mounted upon the turret as to cause the locking of the rock-levers 31 to occur in accordance with what has already been said, modified to some extent by the proper procedure in movement of the shaft of a feed-wheel to be later described.

For the convenient manipulation of the typebar-blanks and the finished typebars the galleys for assembling them are located at the end of the machine adjacent to the die-wheels 7, 8, and 8′. The galley for the typebar-blanks $g$ is designated generally by G, and that for the typebars $g^2$ by $G^2$.

Mechanism is shown for transferring a typebar-blank which has been converted into a typebar from the former galley to the latter, and for imparting a step-by-step or intermittent endwise feeding motion to a blank in the blank galley G for the purpose of bringing successive portions of the blank into a position where a roughing-die and the corresponding finishing-die may act upon it. This intermittent or feeding movement is initiated preferably by the same agency which serves to start a shaft 9 in rotation—namely, a rock-lever 31 and its operating key K—a single movement of which lever serves to effect, in the present instance, not only the rotation of a shaft 9 in the manner aforesaid, but also a feed movement of the blank upon which a type is being formed. This feed mechanism comprises, in the present instance, a feed-wheel or disk 46, which, for securing feed movements of different lengths, may be provided with a number of peripheral portions $46^b$, $46^c$, $46^d$, $46^e$, for instance, of different radius. The feed-wheel 46 is secured to a shaft $9^2$, similar to the shafts 9 already mentioned, and which is similarly mounted in the turret T to rotate about its own axis.

The feed-wheel 46 is adapted at some point in its revolution to coact with a feed-arm 47 pivoted to a stationary portion of the machine, (here shown to consist of a bracket 48 extending from the cross-bar $B^2$,) either prior to the operation of a roughing-die or subsequent to the completion of a type by the combined roughing and finishing die action. For effecting the coöperation of the feed-wheel 46 with its feed-arm 47 a mechanism similar to that described for initiating and continuing the rotation of a shaft 9 is shown and may be employed, except that in this case no sleeve 11 is used, but instead thereof the shaft $9^2$ is represented as being capable of being shifted lengthwise to move the feed-wheel into and out of the plane of the feed-arm 47. The shaft $9^2$ will manifestly need to have two starting-arms 21′, 21′ similar to and in the same planes as the starting-arms 21′, 21′, upon the roughing-die wheel shaft 9. In other words, both of these arms are straight arms—that is, neither is provided with a resetting heel—as it is evident that any projected latch 24 must effect a movement of the roughing-die wheel shaft 9, the feed-wheel shaft $9^2$, and finally a finishing-die wheel shaft 9 by which latter it is properly reset.

The driving-gear 6 with which is adapted to mesh the gear-wheel 15 on the shaft $9^2$, and the shifting cams 17 and 19 with which may coact the cam-arms 18 and 20, respectively, extending from that shaft, may be those already described and operate in a similar manner upon the swinging of shaft $9^2$ by virtue of the contact of its starting-arm with a projected latch to shift the feed-wheel 46 into the plane of the feed-arm 47 and the gear-wheel 15 into engagement with the driver 6. Rotation of the feed-wheel shaft $9^2$ as the turret T rotates brings a determinate peripheral portion of the feed-wheel in contact with the feed-arm and thereby rocks the same backward. It will be understood from the former explanation in what manner the feed-wheel 46 is shifted out of the plane of the feed-arm and returned to its normal or idle position, with the gear-wheel 15 on the shaft disengaged from the driver 6. Some device is also preferably employed for bringing the shaft $9^2$ of the feed-wheel to rest in the same rotative position each time it ceases rotating. This device may consist as before of a plunger $r$ mounted in an opening in a spider-arm and pressed outward by a spring $s$ to coöperate with a flattened portion of the shaft. A retaining device may also be used to hold the shaft $9^2$ in its two axial positions corresponding to the operative and inoperative axial positions of the feed-wheel on the shaft. Such device is not shown in the present drawings, but it may be similar to the corresponding device already described with reference to each shaft 9, from which description its construction and operation will be apparent.

As set forth in the drawings accompanying this specification, the aforesaid motion of the feed-arm 47 serves to actuate a feed-screw 49 by means of the following intermediate transmitting mechanism.

Fixed relatively to the feed-arm 47 is an arm $49^2$ which is joined by a link 50 to an arm 51, and serves through this connection to rock a lever 52, to the free end of which is pivoted one end of a link 53, connected at its opposite end to a pawl-carrier 54 mounted to freely rotate about a stud 55 secured to the side frame 3. A spring-pressed pawl 56 on this pawl-carrier 54 is adapted to engage with the teeth of a ratchet-wheel 57 rotatably mounted upon the stud 55 and fixedly connected to a gear-wheel 58, whose axis of rotation is defined by said stud.

From a study of the intervening transmitting mechanism as organized, it is plain that when the feed-arm 47 is swung backward as the result of the impingement of the feed-wheel 46 against it in the direction of movement of the link 53 it causes the pawl 56 to slide idly over the ratchet-wheel 57, at the end of which movement engagement may take place. A reverse movement of the pawl-carrier 54 accompanied by a simultaneous return of the parts to their normal positions with the feed-arm 47 in a position for subsequent co-action may be brought about by means of a spring 59 inserted between a lug 60 on the sleeve 61, from which, in the present instance, the arm 51 and lever 52 project, and a fixed part 62 on the side frame 3. As an extra precaution to insure this return action and the consequent rotation of the gear-wheel 58, the pawl-carrier 54 may be provided with a toe $54^b$ adapted to contact with a wiper or pin 63 extending from a collar 64 attached to the turret shaft 2 and be turned by it into a position corresponding to the normal position of the parts. A pin 65 with which the lever 52 is adapted to contact determines this normal position.

In the present construction the motion of the gear-wheel 58 is transmitted to the feed-screw 49 through an intermediate gear 66, which meshes with a spur-wheel 67′ attached to the shaft of the screw and serves to impart to the latter an intermittent rotative movement corresponding at each step to the degree of feed movement it is designed that the typebar-blank shall have to bring the same into the proper positions for the successive dies to operate.

The galleys G and $G^2$ before referred to may be made of any suitable form and construction. As here shown, each galley-space consists of a channel disposed transversely with respect to the turret shaft 2, and formed by inner uprights or sides 67, 67 and outer uprights or sides $67^2$, $67^3$, respectively, which extend upward from the respective sides of the galley beds 68, 68. At the front each galley is rigidly secured to the bed-frame B by a pedestal 69. Toward the rear of the machine the galleys in the present embodiment are joined together by a head 70 through a slot 71, in which a blank $g$ may be moved step-by-step during the process of forming type thereon, and be ultimately transferred from the galley G to the assembling galley $G^2$ when it has been provided with its full complement of types.

A number of blanks $g$ are shown in galley G, and in the present case the column of blanks is forced toward the rear of the galley and against the abutment formed by the head 70 by spring tension, whereby an adjacent blank is caused to spring automatically into the place made vacant by the transfer of a completed typebar toward and into the galley $G^2$. The device for this purpose, as here shown, comprises a presser-plate 72 attached to and urged by a presser-rod 73 guided in a slot $73^b$ in the galley bed 68 against the column of blanks under the tension of spring 74 secured at one end to a pin 75 projecting from the exterior of the galley and at the other end to a pin 76, extending from the presser-rod 73. This rod 73 may be formed with a handle 77 to enable the presser-plate to be withdrawn for the purpose of inserting or withdrawing a blank.

Referring now to the means shown for displacing a blank $g$ from its position at the end of the column step by step toward the assembling galley $G^2$ during the process of forming a line of type on its edge, a plunger-plate 78 is adapted to impinge against the right-hand end of the blank, as seen in Fig. 5 and force the blank from its normal position in the column endwise through the slot 71 toward the assembling galley $G^2$. Normally, that is, before it has begun to push a blank through slot 71, this plunger-plate 78 lies, in the present machine, with its end just within said slot but not in a position in which it would interfere with the end blank of the column and upon which the dies are about to operate in determinate succession. The actuator for this plunger-plate, (designated by 79,) is herein shown in the form of a lengthwise movable rod mounted to slide through an opening in the head 70 and through a suitable bearing $79^b$. This actuator may be rigidly secured to the plunger-plate 78 in any suitable manner, the connector here shown comprising a longitudinal fin or tongue 80 extending from the actuator 79 and affixed to a longitudinal rib $80^b$ extending from the plunger-plate. The head 70 is suitably slotted to receive this connector during the movement of the actuator and the plunger-plate 78 where it impinges against the blank may be of a width approximately equal to the height of a blank for securing a good bearing between the two.

Lengthwise motion may be imparted to the actuator 79 as a result of the rotation of the feed-screw 49 by means of an actuator-arm 81 fixed rigidly with reference to the actuator 79 and engaging with the thread of the feed-screw. It is manifest that the slot 71 and the opening in the head 70 through which the rib $80^b$ and tongue 80 slide constitute a guide for the actuator to confine it to its endwise movement and prevent its turning, thus keeping the actuator-arm 81 in proper engagement with the thread of the feed-screw.

A little reflection will make it evident that after the final die has been operated to form the last type upon a blank, and hence the last step in the feed as the result of a die operation has been completed, there yet remains some distance for the now completed typebar to move before it reaches its ultimate endwise position in the assembling galley $G^2$. This transfer movement to the latter galley may be completed by a step-by-step motion, as before, and it could be brought about in a similar manner to that which has already been described through the actuation of a key, which would operate to rotate a shaft during the turret movement an amount sufficient to bring a blank portion on the die-wheel of the shaft, (see 200,) which space, on the die-wheel, it should be mentioned, comes opposite the blank or typebar when the turret rotates with the die-wheels inoperative into juxtaposition with the blank. Preferably, however, the final endwise movement of the typebar for completing its transfer into the assembling galley $G^2$ will be a continuous movement under the control of the operator, whatever the endwise position of the blank or typebar may be with reference to either galley, whether it be in a position at the end of the column in galley G with no type formed upon its edge or in any intermediate position between the two galleys. A construction for permitting this latter mode of operation is herein set forth and shown, being under the control of a key designated "line keys". This key may surmount a push-rod 32 pivoted to a rock-lever 31, similar to those already described, and which is operatively connected with the following mechanism.

A gear-wheel 82 is driven from the turret shaft 2 by means of a gear-wheel 83 secured to that shaft and meshing with an intermediate gear-wheel 84, which in turn engages with the said wheel 82. Rotative movement is imparted by this gear-wheel 82 to a drum 85, whose function is that of a driver for effecting a longer transverse movement of the plunger-plate 78 than any single step-by-step movement, by means of a clutch comprising a swinging member 86 hinged to an axial extension 87 of the drum at the joint 88 and constantly urged by a spring 89 to swing axially and carry a projecting lug 90 on the hinged member into the path of a coacting member 91 revolving with the gear-wheel 82. Normally, the lug 90 of the member 86 and the coacting member 91 are out of engagement with each other and the drum 85 at rest. When, however, the "line key" is depressed the heel 92$^b$ of a lifting-rod 92, pivoted to the rock-lever 31 and pressed by a spring 92$^c$ toward a clutch-operating lever 93, slips under the end of the latter. Upon the release of pressure from the "line key", the operated rock-lever 31 returns to its normal position under the tension of the corresponding elevating spring 94, and the lifting rod 92 being simultaneously moved upward tilts the lever 93 and thereby permits the lug 90 to be pressed into the path of the coacting member 91 by the spring 89. It will be noticed that the lifting-rod 92 has a projection 92$^d$, the inclined surface of which is adapted to contact with a fixed pin 92$^f$, and move the rod backward against the tension of spring 92$^c$ and release the heel 92$^b$ from the lever 93 during the last stage of the upward movement of the rod. When this release occurs the tension of a spring 94 resets the lever in a position to coact with the lug 90. This latter has in the meantime, however, been revolved by the coacting member or pin 91 out of a position in which it can engage with the lever until a revolution of the lug and consequently the drum 85 has been nearly completed. Disengagement of the lug 90 from pin 91 is caused by the lever 93 against which the lug strikes as the member 86 rotates, forcing this latter back against the tension of spring 89 by the action of the inclined or cam-like portion 95 of the lever, which acts to withdraw the lug from engagement with the pin, whereupon the drum 85 comes to rest.

The rock-lever 31 which is operated by the "line key" may or may not be locked by the action of the locking flange 39$^b$.

Referring to the construction of the drum 85 and its accessories, as herein illustrated, which constitute the former a driver for the actuator as above set forth, the drum is provided with a cam-rail 96 forming a shoulder against which bears a cam-roller 96$^b$ mounted upon a stud fixed relatively to the actuator 79. Hence the rotation of the drum effects a traverse of the actuator and the consequent transfer of a typebar or blank into its position at the end of the column of bars in the assembling galley G$^2$. It will be remembered, however, that the arm 81 extending from the actuator 79 engages with the feed-screw 49. To permit, therefore, the final independent transfer of the bar or blank by the actuator, as above, without the necessity of disengaging the arm from the feed-screw, means are in the present instance provided for disengaging the feed-screw from its driving-gear 66 and allow the former to rotate freely in its bearings. The device here shown consists of a clutch, operating and constructed as follows:—

The feed-screw shaft 98 is mounted to rotate independently of but concentric with the shaft 99 of the gear-wheel 66, while the latter shaft is connected to the former by means of a pawl-and-ratchet connection consisting of a pawl 100 pivoted to the face of a pawl-carrier 101 rigidly secured to the shaft 99. This pawl 100 is adapted to engage with the teeth of a ratchet-wheel 102 rigid with the shaft 98. For the purpose of rendering this connection inoperative at such times as the drum rotates, a conical releasing wheel 103 slidable lengthwise of the shaft 98 is adapted to be moved to and fro by an oscillatory lever 104 pivoted intermediate its ends to a stationary bracket 105 and having a pin 104$^b$ at one end which enters an annular groove 104$^c$ in the conical releasing wheel 103. In its movement toward the ratchet-wheel 102 the conical surface of the wheel 103 impinges against a projection 106 on the pawl 100, thereby lifting the latter out of engagement with the teeth of the ratchet-wheel 102 and leaving the feed-screw shaft 98 free to turn in its bearings as the arm 81 is moved lengthwise of the feed-screw axis. Upon withdrawing the wheel 103 reëngagement of the pawl 100 and ratchet-wheel 102 takes place, an action assured by the pawl-spring 107, and the gear 66 is again rendered effective for rotating the feed-screw 49. The proper movement of the lever 104 to accomplish the necessary movement of the conical wheel 103 is, in the present instance, effected by a suitable cam curve 108 in the aforementioned axial projection 87 of the drum 85.

Assuming now that the actuator 79 has been moved to its furthest position toward the left-hand in Fig. 5 by the action of the cam-rail 96 on the rotating drum 85, the latter will not yet, in the present machine, have completed its rotation but the roller 96$^b$ will have reached the end of the rail 96. As here organized, further rotative movement of the drum will bring the roller against a return rail 96$^B$ which operates to withdraw the plunger-plate 78 from the slot 71 in the head 70 to an extent which leaves it ultimately in a position in which it does not project into the channel or space of galley G. A space is thus left for the next blank $g$ in the column to move into a position where the dies may operate upon it, which position it assumes by reason of the tension of spring 74. When the plunger-plate 78 has assumed this position to the right as set forth in Fig. 5, the roller 96$^b$ will have passed the end of cam-rail 96$^B$ and the operative edge of cam-rail 96 will have been brought around into a position in which it is adapted to coact with the roller. The drum 85 will cease rotating in this position of the parts by reason of the disengagement of lug 90 and pin 91 while the gear-wheel 66 is rendered effective to rotate the feed-screw 49 just prior to the cessation of rotation in the manner before explained.

Each typebar-blank would, after its upper edge has been operated upon to form a typebar and this bar has been shifted into the assembling galley G$^2$, and if no further movement was given to it, be in a position to interfere with the next bar as this latter bar is being shifted endwise by the plunger-plate 78. To remove this bar from the inner end of the assembling galley for the purpose of providing room for the succeeding bar, mechanism is provided which is adapted to shift the bar lengthwise of the assembling galley. The bar so shifted forms with previously shifted bars a column of assembled typebars which is held by a suitable device or devices in a position to form a free space for the entrance of the advancing bar. This mechanism for shifting a bar laterally is rendered operative in the present instance by the drum 85 before the latter has completed its rotation and after a bar has been transferred to the inner end of galley G$^2$. It comprises, as here illustrated, an assembling plunger 109 mounted to slide through bearings 110 and 110$^b$ and provided with a head 111, adapted to bear against the end bar of the column. Normally, this head 111 is sufficiently withdrawn toward the rear of the machine to permit a bar to be moved in front of it.

A forward movement of the plunger serves to carry the bar in contact with its head laterally forward to bring the bar into contact with the end bar of the assembled column. This movement of the bar causes the deflection of a pair of retaining pawls 112, 112. When released from the bar by reason of the continued forward movement thereof each of these pawls springs back into place under the tension of springs 112$^b$, 112$^b$, (as shown in Fig. 5,) and thus prevent the backward movement of the column. A yielding abutment is also provided for holding the column of typebars in place, and comprises, as shown, a plate 72$^b$, on the end of a presser-rod 73$^B$ which is guided in a slot 73$^c$ in the galley bed 68. This rod 73 is urged inward by a spring 74$^b$ attached to pins 75$^b$ and 76$^b$.

These several features may be similar to the corresponding ones already described with respect to the other galley G, while the presser-rod 73$^B$ may have a handle 77$^b$ for a similar purpose to the handle 77.

Referring now to means for imparting an intermittent reciprocation to the assembling plunger 109, as here shown, this plunger is jointed to an arm 113 secured to a rock-shaft 114 journaled in bearings adjacent to the rear of the machine. An actuator link 117 pivoted at one end to a rock-arm 116 extending from the rock-shaft 114 is utilized for rocking the latter. This link may be actuated from the shaft of the drum 85, and the actuating means may consist, as shown, of a cam 117$^b$ adapted to impinge against a projection or cam-roller 118 extending from the link. The link may be forked, as shown, to embrace the shaft of the drum and form a guide for the link. In the present instance the assembling plunger 109, after being moved forward is retraced by a spring 119 inserted between a collar 120 on the plunger and the bearing 110$^b$, which spring also serves the purpose of returning the connected parts to their normal positions relative to the cam 117$^b$.

A machine constructed and organized according to the foregoing description and as illustrated operates substantially in the following manner: Assuming the turret T to be in rotation with the cam 42 at a particular instant in a position in which the locking flange 39$^b$ has been swung away from the rock-levers 31 to unlock the same, a key K under these conditions may be depressed to actuate a rock-lever. The corresponding actuator 29 is simultaneously operated and causes the tripping of the corresponding latch 24 through the medium of the shoulder 30$^b$ on the actuator and the intervening arm 30, rock-shaft 27 and finger 26. It is evident from what has already been described that the first starting-arm to reach the projected latch will be an arm 21' on the feed-wheel shaft 9$^2$. Engagement between this arm and the latch occurs, (see Fig. 11,) and results, as the turret rotates, in the turning of that shaft, bringing the cam-arm 18 on the shaft into contact with the cam 17 and causing the shifting of the shaft longitudinally in its bearings. Continued rotation of the turret carries the gear 15 on the shaft into engagement with the driver 6. Rotation of the shaft now continues and a predetermined peripheral portion of the feed-wheel 46 is brought into contact with the feed-arm 47, whereupon the latter is rocked, and its motion, through the described transmitting mechanism, effects a partial rotation of the pawl-carrier 54. The movement of this pawl-carrier causes the pawl 56 to slip over the ratchet-wheel 57. The parts are returned to their normal or idle position after the feed-wheel has passed out of contact with the feed-arm by the spring 59, an action which is assured by the projection or wiper 63 revolving with the turret, and adapted to coact with the toe 54$^b$ on the pawl-carrier as aforesaid. Simultaneously with this return movement the feed-screw 49 has been turned in its bearings and the actuator 79 and plunger-plate 78 shifted longitudinally to cause a blank to be displaced from the position it previously occupied toward the assembling galley G$^2$. Returning now to the action of the feed-wheel during its further orbital and rotating movement, it will happen that sometime after the actuation of the feed-arm 47, cam-arm 17 will pass out of contact with cam 18, which action is followed by the contact of arm 20 on the feed-wheel shaft with cam 19. A return movement of the shaft will then ensue, resulting in the disengagement of the gear 15 from the driver 6 and the shifting of the feed-wheel out of the plane of the feed-arm.

Referring now to the further actions initiated by the projected latch, for it will be remembered that the arm 21′ on the feed-wheel shaft is unprovided with any resetting heel, the next starting-arm to contact with it will be one of the starting-arms 21′, extending from the sleeve 11, mounted on the roughing die-wheel shaft 9, (see Fig. 12.) Longitudinal movement of this sleeve along its shaft to engage the gear-wheel 15 thereon with the driver 6, and subsequently to disengage it therefrom, occurs in a similar manner to that already described with respect to shaft 9$^2$ of the feed-wheel. As a result of this rotation of the roughing die-wheel 7, that die thereon which is referable to the key K operated is brought into contact with the blank $g$ upon whose edge it is designed that it shall operate and an impression is made; or, in other words, a space on the typebar-blank is blocked out preparatory to the action of the finishing-die. Subsequently to the operation of this die the roughing die-wheel is rendered inoperative in a manner that will be readily understood on referring to the description given with respect to the operation of the feed-wheel shaft. It will further be remembered that the starting-arm 21′ on the shaft of the roughing die-wheel is unprovided with a latch-resetting heel; hence when the starting-arm 21 on a finishing die-wheel shaft lying in the plane of the latch reaches the position of the same it will find it still projected and coöperating with it, cause the operation of that finishing-die which corresponds to the roughing die and effect the completion of the type, (see Figs. 13 and 14.) The manner in which this is accomplished will be understood from the foregoing explanation.

There being a resetting-heel 22 on the starting-arm 21 extending from the sleeve mounted upon each finishing die-wheel shaft 9, the action of this starting-arm, that is the last one in the series which is actuated during the rotation of the turret, resets the latch, (see Fig. 15.) The turret now rotates without having any of the starting-arms provided thereon, again rendered operative from the same latch until this latter is again caused to be projected, (see Fig. 16.) Such substantially is the action of the machine each time a key K is depressed, which depression is possible, however, during that portion only of the turret rotation when the correct sequence of operations is assured through the action of the locking flange 39$^b$.

Supposing now that the last type on the blank has been made and completed, or if, for any reason it is desired to transfer a blank to the assembling galley G$^2$, pressure upon the "line key" results in a depression of the rock-lever 31, to which it is attached and also the lifting-rod 92 carried by the latter. Upon assuming its normal position under the tension of its spring 34 this lever 31 rocks the cam-lever 93 and permits the engagement of lug 90 with pin 91, as previously explained. Rotation of the drum 85 now takes place and the cam-rail 96 operating against the cam-roller 96$^b$ causes a longitudinal traverse of the actuator 79. In the meantime the shaft 98 of the feed-screw 49 has been unlocked from its driving-shaft 99 by the action of cam groove 108 to permit this traverse to take place with the arm 81 in engagement with the thread of the feed-screw. A blank or typebar is in consequence of the rotation of drum 85 shifted to its final endwise position in the assembling galley G$^2$ by the plunger-plate 78, as will be readily understood. When the shifting movement has been accomplished the roller 96$^b$ having left the rail 96 contacts with the rail 96$^h$, which latter rail operates to return the actuator and attached plunger-plate to their normal positions. At some time during this return movement of the plunger-plate 78 and after it has been withdrawn entirely from the blank-galley G, spring 74 pushes the column of blanks forward to bring the next blank into the space made vacant by the plunger-plate 78. Soon thereafter the drum 85 comes to rest as the result of the disengagement of lug 90 and pin 91, through the action of the cam portion of the clutch-operating lever 93, as already explained. Sometime before the drum 85 has ceased rotating, however, the cam 117$^b$ will have been brought to bear against the projection or cam-roller 118 on the link 117 to shift a typebar or blank just transferred to the galley G$^2$ forward in front of the spring-pressed retaining pawls 112, 112. When this action has occurred, the plunger and other connected members are returned to their normal positions by spring 119. This action of the various parts and mechanisms is repeated upon any subsequent actuation of a key.

Having thus described my invention, I claim—

1. A typebar machine having, in combination with a carrier and a finishing-die mounted thereon; a carrier and a roughing or blocking-out die mounted thereon.

2. A typebar machine having, in combination with a first die which prepares a portion of the face of the typebar to have a finished character impressed thereon; a second die which operates independently of the first die, and finishes said impressed character.

3. A typebar machine having, in combination with a finishing-die, a roughing or blocking-out die adapted to operate independently of and in advance of the finishing-die.

4. A typebar machine having, in combination with a finishing-die, a roughing or blocking-out die, and mechanism for causing these dies to operate independently and in succession on a typebar-blank to make a type.

5. The combination, with a carrier, of a roughing or blocking-out die; a carrier with a finishing die mounted thereon; and mechanism for actuating the carrier to pass the dies successively past the operative point.

6. The combination, with a carrier, having a roughing or blocking-out die mounted thereon; a carrier having a finishing-die mounted thereon; and mechanism for actuating the carrier to pass the die successively past the operative point and for rendering the dies operative.

7. The combination of a carrier having a roughing or blocking-out die mounted thereon; a carrier having a finishing-die mounted thereon; and mechanism for actuating the carrier to pass the dies past the operative point and for causing the roughing or blocking-out die to operate in advance of the finishing-die.

8. The combination of a carrier having a roughing or blocking-out die mounted thereon; a plurality of carriers having finishing-dies mounted on each, respectively, and mechanism for actuating the carrier to pass the dies past the operative point and for causing the roughing or blocking-out die to operate in advance of any particular finishing-die.

9. A typebar machine having, in combination with a carrier and a finishing-die mounted thereon; a carrier and a roughing or blocking-out die mounted thereon; and feed mechanism.

10. A typebar machine having, in combination with a first die which prepares a portion of the face of the typebar to have a finished character impressed thereon; a second die which operates independently of the first die, and finishes said impressed character; and feed mechanism.

11. A typebar machine having, in combination with a finishing-die, a roughing or blocking-out die adapted to operate independently of, and in advance of, the finishing-die; and feed mechanism.

12. A typebar machine having, in combination with a finishing-die, a roughing or blocking-out die; mechanism for causing said dies to operate independently and in succession on a typebar blank, to form a type-face; and feed mechanism.

13. The combination, with a carrier, of a roughing or blocking-out die; a plurality of finishing-dies mounted thereon; mechanism for actuating the carrier and causing the roughing or blocking-out die to operate in advance of any particular finishing die; and feed mechanism.

14. A typebar machine having, in combination, a carrier and a die mounted thereon; a second carrier and a plurality of dies mounted thereon; mechanism for actuating the carriers to move successively to and by an operative point on a typebar blank; and feeding mechanism for said typebar blank.

15. A typebar machine having, in combination, a carrier; a roughing or blocking-out die mounted thereon; a second carrier, having a finishing-die mounted thereon; and means for feeding a typebar blank.

16. The combination with rotatable die carriers, of roughening-out dies mounted on one and finishing dies mounted on the other carrier; a main carrier on which the said die carriers are mounted; mechanism for selecting a desired finishing die and its proper roughening out die and for causing the selected dies to successively operate on a type blank portion of a typebar blank; and means for causing a feed movement of the blank.

17. The combination of a carrier; a roughing or blocking-out die mounted thereon; a second carrier; a finishing-die mounted thereon; mechanism for actuating the carriers and for causing the roughing or blocking-out die to operate on a typebar-blank in advance of the finishing-die; and means for causing a feed movement of said blank.

18. The combination, with a rotary carrier, of a roughing or blocking-out die and a finishing-die mounted thereon; and mechanism for actuating the carrier to pass the dies successively past the operative point.

19. The combination, with a rotary carrier, of a roughing or blocking-out die and a finishing-die mounted thereon; and mechanism for actuating the carrier to pass the dies successively past the operative point and for rendering the dies operative.

20. The combination, with a rotary carrier, of a roughing or blocking-out die and a finishing-die mounted thereon; and mechanism for actuating the carrier to pass the dies past the operative point and for causing the roughing or blocking-out die to operate in advance of the finishing-die.

21. The combination, with a rotary carrier, of a roughing or blocking-out die and a plurality of finishing-dies mounted thereon; and mechanism for actuating the carrier to pass the dies past the operative point and for causing the roughing or blocking-out die to operate in advance of any particular finishing-die.

22. The combination, with a rotary carrier, of a roughing or blocking-out die; a finishing-die; mechanism for actuating the carrier and causing the roughing or blocking-out die to operate in advance of the finishing-die; and feed mechanism.

23. The combination, with a rotary carrier, of a roughing or blocking-out die; a plurality of finishing-dies mounted thereon; mechanism for actuating the carrier and causing the roughing or blocking-out die to operate in advance of any particular die; and feed mechanism.

24. The combination, with a rotary carrier, of a roughing or blocking-out die; a finishing-die; mechanism for actuating the carrier and causing the roughing or blocking-out die to operate on a typebar-blank in advance of the finishing-die; and means for causing a feed movement of the blank.

25. A typebar machine having, in combination with a finishing-die, a roughing die, one of said dies being mounted upon a die-wheel.

26. A typebar machine having, in combination with a finishing-die supported upon a die-wheel, a roughing-die also supported upon a die-wheel.

27. A typebar machine having, in combination, a pair of orbitally and rotatably movable shafts; die carriers mounted on said shafts; starting arms extending from said shafts and one only of which arms being provided with a resetting heel; and selective latch mechanism.

28. The combination, of a die-wheel supporting a roughing or blocking-out die; and a second die-wheel supporting a finishing-die.

29. The combination, of a die-wheel supporting a roughing or blocking-out die; a second die-wheel supporting a plurality of finishing-dies; and means for causing any particular one of said finishing-dies to operate.

30. A typebar machine having, in combination, a plurality of orbitally and rotatably movable shafts; die carriers mounted on said shafts; starting arms extending from said shafts each of which arms with the exception of one being provided with a resetting heel; and selective latch mechanism.

31. The combination, of a die-wheel supporting a roughing or blocking-out die; a second die-wheel supporting a finishing-die; and a carrier on which the wheels are mounted.

32. The combination, of a die-wheel supporting a roughing or blocking-out die; a second die-wheel supporting a plurality of finishing-dies; means for causing any particular one of said finishing-dies to operate; and a carrier on which the wheels are mounted.

33. A typebar machine having, in combination, a selective latch mechanism, a plurality of orbitally and rotatably movable shafts; a roughening-out die carrier mounted on one of said shafts and finishing die carriers mounted on others of said shafts; starting arms extending from said shafts, the arms on the finishing die carrier shafts being provided with resetting heels; and means for insuring the engagement of the starting arm on the roughening-out die carrier shaft with the actuated latch mechanism before the engagement of the starting arm on a finishing die carrier shaft therewith.

34. The combination, of a die-wheel supporting a roughing or blocking-out die; a second die-wheel supporting a finishing-die; and shafts to which said die-wheels are attached.

35. The combination, of a die-wheel supporting a roughing or blocking-out die; a second die-wheel supporting a plurality of finishing-dies; means for causing any particular one of said finishing-dies to operate; and shafts to which said die-wheels are attached.

36. A typebar machine having, in combination, a selective latch mechanism, a plurality of orbitally and rotatably movable shafts; a roughening-out die carrier mounted on one of said shafts and finishing die carriers mounted on others of said shafts; starting arms extending from said shafts, the arms on the finishing die carrier shafts being provided with resetting heels; and means for locking the selective mechanism from operation during the period beginning with the passage of the starting arm on the roughening-out die carrier shaft out of operative relation with the actuated latch mechanism and ending with the passage of the last starting arm on the finishing die carrier shafts out of operative relation with the actuated latch mechanism.

37. The combination, of a die-wheel supporting a roughing or blocking-out die; a second die-wheel supporting a finishing-die; a carrier on which the wheels are mounted; and a feed mechanism.

38. The combination, of a die-wheel supporting a roughing or blocking-out die; a second die-wheel supporting a plurality of finishing-dies; means for causing any particular one of said finishing-dies to operate; a carrier on which the wheels are mounted; and a feed mechanism.

39. The combination, with a rotary carrier, of a die-wheel supporting a roughing or blocking-out die mounted on the carrier; a die-wheel supporting a finishing-die also mounted thereon; mechanism for causing the said dies to operate in succession to complete a type; means for causing a step-by-step feed movement of the typebar-blank; and means for displacing a blank from its position when provided with its complement of types to permit a second blank to assume its operative position with respect to said dies.

40. The combination, with a rotary carrier, of a die-wheel supporting a roughing or blocking-out die mounted on the carrier; a die-wheel supporting a finishing-die also mounted thereon; mechanism for causing said die-wheels to start in rotation at a predetermined point to cause said dies to operate in succession upon a typebar-blank and form a type; and mechanism for displacing a blank when provided with its complement of types to permit a second blank to assume its operative position with respect to said dies.

41. The combination, of a carrier, rotatable but axially immovable die-wheels mounted thereon; and a rotatable and axially movable feed-wheel.

42. The combination, of a rotary carrier, rotatable but axially immovable die-wheels mounted thereon; and a rotatable and axially movable feed-wheel.

43. The combination, of a carrier, rotatable but lengthwise immovable die-wheels mounted thereon; shafts to which said die-wheels are attached and which are mounted on said carrier; a feed-wheel; and a rotatable and lengthwise movable shaft mounted on the carrier and to which said feed-wheel is attached.

44. The combination, of a carrier, rotatable but axially immovable die-wheels mounted thereon; a rotatable and axially movable feed-wheel; a feed-arm with which said feed-wheel is adapted to coöperate; and mechanism for feeding a typebar-blank operative from said feed-arm.

45. The combination, of die-wheels; shafts to which the die-wheels are attached; lengthwise movable sleeves mounted upon said shafts to rotate therewith; gear-wheels attached to said sleeves; a driver for rotating said gear-wheels; a feed-wheel; a shaft to which the feed-wheel is secured; a gear secured to the feed-wheel shaft; a feed-arm with which said feed-wheel is adapted to coöperate; and mechanism actuated by said feed-arm.

46. The combination, of a carrier; die-wheels; shafts to which said die-wheels are attached; starting-arms for initiating the rotation of the die-wheels, each of which starting-arms is disposed in a different plane to the plane of any other arm; feed mechanism; and starting-arms for actuating said feed mechanism located in the planes of the several starting-arms for initiating the movements of the die-wheels.

47. The combination, of a carrier; die-wheels; shafts to which said die-wheels are attached; starting-arms for initiating the rotation of the die-wheels, each of which starting-arms is disposed in a different plane to the plane of any other arm; feed mechanism; and starting-arms for actuating said feed mechanism located in the planes of the several starting-arms for initiating the movements of the die-wheels; and selective devices for initiating the rotation of a die-wheel shaft at predetermined points.

48. The combination, of a carrier; die-wheels; shafts to which the die-wheels are attached and which are mounted on the carrier to rotate but to be fixed axially; a feed mechanism comprising a rotatable and lengthwise movable shaft; and selective devices for initiating the rotation of a shaft at a predetermined point.

49. The combination, of a carrier; a roughing-die; a wheel on which said die is supported; a shaft to which the wheel is attached; feed-mechanism comprising a shaft mounted on the carrier; and starting-arms located upon said shafts in different planes.

50. The combination, of a carrier; a roughing-die; a wheel on which the roughing-die is supported; a plurality of finishing-die wheels; starting-arms for initiating the rotary movement of the said wheels; and selective devices for commencing said movement at predetermined points.

51. The combination, of a carrier; a roughing-die; a wheel on which the roughing-die is supported; a plurality of finishing-die wheels; starting-arms for initiating the rotary movement of the said wheels; a feed-wheel shaft; and selective devices for commencing said movement at predetermined points.

52. In a typebar machine, a roughing-die, and a plurality of finishing-dies, any one of which latter is adapted to coöperate with the roughing-die.

53. In a typebar machine, a roughing die-wheel; and a plurality of finishing die-wheels.

54. In a typebar machine, the combination, of a rotary carrier; a roughing-die; and a plurality of finishing-dies any one of which latter is adapted to coöperate with the roughing-die.

55. In a typebar machine, the combination, of a rotary carrier; a roughing die-wheel; and a plurality of finishing die-wheels.

56. The combination, of a carrier; a roughing die-wheel; a plurality of finishing die-wheels; and means for automatically feeding a typebar-blank.

57. The combination, of a roughing-die; a finishing-die; selective devices for causing said dies to operate; and means for automatically feeding a typebar-blank.

58. The combination, of a roughing-die; a finishing-die selective devices for causing said dies to operate; and means for rendering the selective devices inoperative or locked except when a proper sequence in action of said dies is attainable.

59. The combination, of a roughing-die; a finishing-die; selective devices for causing said dies to operate; means for rendering the selective devices inoperative or locked except when a proper sequence in action of said dies is attainable; and feed mechanism.

60. The combination, of a carrier; a roughing-die-wheel; a finishing die-wheel; selective devices for causing said dies to operate; and means for rendering the selective devices inoperative or locked except when the proper sequence in action of said dies is attainable.

61. The combination, of a carrier; a roughing-die-wheel; a finishing die-wheel; selective devices for causing said dies to operate; means for rendering the selective devices inoperative or locked except when the proper sequence in action of said dies is attainable; and feed mechanism.

62. The combination, with means for forming a type on a typebar-blank, of means for imparting a step-by-step movement of the blank; a typebar-blank galley; an assembling galley; and mechanism independent of said means for transferring a blank from the typebar-blank galley to the assembling galley.

63. The combination, with means for forming a type on a typebar-blank, of means for imparting a step-by-step feed movement to the blank; a typebar-blank galley; an assembling galley; and mechanism independent of said means under the control of the operator for transferring a blank in the typebar-blank galley to the assembling galley.

64. The combination of a rotatable member; a die-carrier mounted thereon and adapted to impress characters upon a typebar; manipulative means operatively engaging said rotatable member with mechanism adapted to transfer, by a continued movement, a typebar from a typebar-blank galley to an assembling galley; said typebar-blank galley; and said assembling galley.

65. The combination with a typebar-blank galley and an assembling galley of a carrier; dies mounted thereon; a plunger-plate deriving motion from the carrier for transferring a typebar from the typebar-blank galley to the assembling galley; an actuator for effecting the motion of the plunger-plate; and a clutch for rendering the actuator operative for this purpose or causing it to be inoperative.

66. The combination with a typebar-blank galley and an assembling galley of a carrier; dies mounted thereon; a rotatable drum; a cam-rail secured to the drum; a plunger plate for transferring a typebar from the typebar-blank galley to the assembling galley; mechanism for effecting this transfer motion of the plunger-plate; a clutch for rendering this mechanism operative or inoperative; and means for returning the plunger-plate to its inoperative position.

67. The combination with a typebar-blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; and means for automatically returning the plunger-plate to its inoperative position.

68. The combination with a typebar-blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; and means comprising a second cam-rail affixed to said drum for returning the plunger-plate to its inoperative position.

69. The combination with a typebar-blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; means for returning the plunger-plate to its inoperative position; and means for automatically stopping the rotation of said drum.

70. The combination with a typebar-blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; means for returning the plunger-plate to its inoperative position; and means for automatically throwing out said clutch to stop the rotation of said drum.

71. The combination with a typebar-blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; means for returning the plunger-plate to its inoperative position; means for automatically throwing out said clutch to stop the rotation of said drum; and a key for operating the clutch.

72. The combination with a typebar blank galley and an assembling galley of a carrier; dies mounted thereon; a rotatable drum; a cam-rail secured to the drum; a plunger-plate for transferring a typebar from the typebar-blank galley to the assembling galley; mechanism for effecting this transfer motion of the plunger-plate; a clutch for rendering this mechanism operative or inoperative; means for returning the plunger-plate to its inoperative position; means for automatically throwing out said clutch to stop the rotation of said drum; a rock-lever adapted to coact with said clutch and actuate the same; and a key for operating the rock-lever.

73. The combination with a typebar blank galley and an assembling galley of a carrier; dies carried thereby; means deriving motion from the carrier for transferring a typebar from the typebar-blank galley to the assembling galley when actuated by the operator; and feed mechanism.

74. The combination with a typebar blank galley and an assembling galley of a carrier; dies mounted thereon; a plunger-plate deriving motion from the carrier for transferring a typebar from the typebar-blank galley to the assembling galley: an actuator for effecting the motion of the plunger-plate; a clutch for rendering the actuator operative for this purpose or causing it to be inoperative; and feed mechanism.

75. The combination with a typebar blank galley and an assembling galley of a carrier, dies mounted thereon, means for actuating the dies, a rotatable drum, a cam-rail secured to the drum, a plunger-plate for transferring a typebar from the typebar-blank galley to the assembling galley, means actuated by the die actuating means for effecting a step by step transfer motion of the plunger-plate, and mechanism actuated by said cam-rail for effecting a continuous transfer motion of the plunger-plate; a clutch for rendering this mechanism operative or inoperative, and means for returning the plunger-plate to its inoperative position.

76. The combination with a typebar blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger plate, and mechanism actuated by said cam-rail for effecting a continuous transfer motion of the plunger-plate, a clutch for rendering this mechanism operative or inoperative, and means comprising a second cam-rail affixed to said drum for returning the plunger-plate to its inoperative position.

77. The combination with a typebar blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for returning the plunger-plate to its inoperative position, and means for automatically stopping the rotation of said drum.

78. The combination with a typebar-blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for returning the plunger-plate to its inoperative position, and means for automatically throwing out said clutch and stopping the rotation of said drum.

79. The combination with a typebar blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for automatically throwing out said clutch to stop the rotation of said drum, and a key for operating the clutch.

80. The combination with a typebar-blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for returning the plunger-plate to its inoperative position, means for automatically throwing out said clutch to stop the rotation of said drum, a rock-lever adapted to coact with said clutch and actuate the same, and a key for operating the rock-lever.

81. The combination with a typebar-blank galley and an assembling galley of a carrier; dies mounted thereon; a plunger-plate deriving motion from the carrier for transferring a typebar from the typebar-blank galley to the assembling galley; an actuator for effecting the motion of the plunger-plate; a clutch for rendering the actuator operative for this purpose of causing it to be inoperative; and a feed screw.

82. The combination with a typebar-blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, and means for automatically returning the plunger-plate to its inoperative position.

83. The combination with a typebar-blank galley and an assembling galley of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for returning the plunger-plate to its inoperative position, and means for automatically throwing out said clutch to stop the rotation of said drum.

84. The combination of a carrier, dies mounted thereon, selective means for bringing the dies to working position, a rotatable drum, a cam-rail secured to the drum, a plunger-plate for transferring a typebar from the typebar-blank galley to the assembling galley, means actuated by the said selective means for effecting a step by step transfer motion of the plunger-plate, and mechanism actuated by said cam-rail for effecting a continuous transfer motion of the plunger-plate, a clutch for rendering this mechanism operative or inoperative, means for returning the plunger-plate to its inoperative position, means for automatically throwing out said clutch to stop the rotation of said drum, and a key for operating the clutch.

85. The combination, of a feed-screw; a longitudinally movable actuator; an actuator-arm engaging with the thread of the feed-screw; means for rendering the screw inoperative to prevent movement of the arm in one direction; and a cam-rail for moving said actuator.

86. The combination, of a feed-screw; a longitudinally movable actuator; an actuator-arm engaging with the thread of said feed-screw; a driving-gear for rotating said feed-screw; and means for disengaging the gear from the feed-screw to permit movement of the arm in its engaged position.

87. The combination, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; and a cam-rail for moving the actuator.

88. The combination, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; and a drum to which said rail is secured.

89. The combination, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; and means operative from the drum for disengaging said gear from said feed-screw.

90. The combination, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; and means comprising an oscillatory lever cam-operated from said drum for disengaging said gear from said feed-screw.

91. The combination, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; means comprising an oscillatory lever cam-operated from said drum for disengaging said gear from said feed-screw; and a second cam-rail on the drum adapted to move the actuator in an opposite direction to the first-mentioned cam-rail.

92. The combination with a typebar-blank galley and an assembling galley, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; and a plunger-plate controlled by said actuator and adapted to displace a typebar from the typebar-blank galley toward the assembling galley.

93. The combination with a typebar-blank galley and an assembling galley, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; and a plunger controlled by said actuator and adapted to displace a typebar from the typebar-blank galley toward the assembling galley.

94. The combination with a typebar-blank galley and an assembling galley, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; means operative from the drum for disengaging said gear from said feed-screw; and a plunger-plate controlled by said actuator and adapted to displace a typebar from the typebar-blank galley toward the assembling galley.

95. The combination with a typebar-blank galley and an assembling galley, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; means comprising an oscillatory lever cam-operated from said drum for disengaging said gear from said feed-screw; and a plunger-plate controlled by said actuator and adapted to displace a typebar from the typebar-blank galley toward the assembling galley.

96. The combination with a typebar-blank galley and an assembling galley, of a feed-screw; a longitudinally movable actuator; an actuator-arm carried thereby and engaging with the thread of said feed-screw; a driving-gear for rotating said feed-screw; means for disengaging the gear from the feed-screw to permit movement of the arm in its engaged position; a cam-rail for moving the actuator; a drum to which said rail is secured; means comprising an oscillatory lever cam-operated from said drum for disengaging said gear from said feed-screw; a second cam-rail on the drum adapted to move the actuator in an opposite direction to the first-mentioned cam-rail; and a plunger-plate controlled by said actuator and adapted to displace a typebar from the typebar-blank galley toward the assembling galley.

97. The combination, in a typebar machine, of means for moving a typebar from a typebar-blank galley into an assembling galley; and a plunger-plate reciprocatable longitudinally of said assembling galley, and operatable to maintain a typebar lengthwise in a transverse position, relative to said assembling galley, and to move said typebar longitudinally of said galley.

98. The combination, in a typebar machine, of means for moving a typebar from a typebar-blank galley into an assembling galley; a plunger-plate reciprocatable longitudinally of said assembling galley, and operatable to maintain a typebar lengthwise in a transverse position, relative to said assembling galley, and to move said typebar longitudinally of said galley; and means for retaining the assembled typebars in position.

99. The combination with a typebar-blank galley and an assembling galley, of a plunger-plate; an actuator therefor; a feed-screw for moving the actuator; means for moving a typebar displaced from the typebar-blank galley into the assembling galley longitudinally of the latter galley to make room for a succeeding typebar; and means for holding the assembled bars.

100. The combination with a typebar-blank galley and an assembling galley, of a plunger-plate; an actuator therefor; a feed-screw for moving the actuator; means for moving a typebar displaced from the typebar-blank galley into the assembling galley longitudinally of the latter galley to make room for a succeeding typebar; means for holding the assembled bars comprising a drum; a cam on the drum-shaft; a rock-shaft; and a connecting-link adapted to be actuated by said cam.

101. The combination of an assembling galley; a rock-shaft; an assembling plunger movable in one direction, by said rock-shaft; a spring for returnably moving said plunger; a retaining plate; and means for retaining a typebar against said retaining plate, when said typebar has been moved longitudinally of the galley by said plunger.

102. The combination, with an assembling galley, of a feed-screw; a drum; a cam-rail secured thereto; a plunger-plate; an actuator for said plunger-plate; an assembling plunger for shifting a bar longitudinally of the assembling galley simultaneously with the withdrawal of the plunger-plate preparatory to the displacement of a second typebar.

103. In a typebar machine, the combination of a rotatable member, a slider mounted parallel with said rotatable member, and slidable thereby across a galley; said galley; and a second galley lying parallel with said galley, and having a transverse passage opposite the end of the slider.

104. In a typebar machine, a galley for blanks; an assembling galley; a passage or slot extending from one to the other through which a typebar may be moved; and springs for keeping the typebars and typebar-blanks in position in said galleys and for shifting a blank into operative position when the finished bar has been displaced from the typebar-blank galley.

105. In a typebar machine, the combination of a rotatable member; a slider mounted parallel with said rotatable member and slidable thereby across a galley; said galley; a second galley lying parallel with said galley, and having a transverse passage opposite the end of the slider; and means in said second galley for holding a column of assembled typebars.

106. In a typebar machine, the combination of a rotatable member; a slider mounted parallel with said rotatable member and slidable thereby across a galley; said galley; a second galley lying parallel with said galley, and having a transverse passage opposite the end of the slider; a retaining plate in said second galley; and means in said second galley for holding a column of assembled typebars.

107. The combination with a plurality of latches, of an actuator; and a series of interchangeable intervening transmitters one for each latch, whereby the actuator may be operatively connected with any latch.

108. The combination with a plurality of latches disposed in the same plane, of an actuator; and a series of interchangeable intervening transmitters, one for each latch, whereby the actuator may be operatively connected with any latch.

109. The combination with a plurality of latches, of a plurality of actuators; and intervening transmitter rods disposed transversely to the actuators, there being one rod for each latch, whereby any actuator may be operatively connected with any latch.

110. The combination, with an actuator, of a plurality of latches lying in different planes; and a series of intervening transmitters one for each latch whereby the actuator may be connected with any latch.

111. The combination with a plurality of latches, of an actuator; a plurality of rock shafts disposed transversely to the actuator and equal in number to the number of latches; and a tripping finger operatively connecting each rock shaft with a latch.

112. The combination with a plurality of latches, of an actuator; a plurality of rock shafts disposed transversely to the actuator and equal in number to the number of latches; and a tripping finger extending from each rock shaft and operatively connecting the shaft with a latch.

113. The combination with a plurality of latches, of a number of actuators; rock shafts disposed transversely to the actuators and equal in number to the number of latches; and a tripping finger extending from each rock shaft and operatively connecting the shaft with a latch.

114. The combination with an actuator, of a latch; a rock shaft disposed transversely to the actuator; a tripping finger extending from the rock shaft and adapted to coöperate with the latch; a stop shoulder on the actuator; and an arm extending from the rock shaft and adapted to coöperate with the stop shoulder.

115. The combination with a number of actuators, of a number of latches; a plurality of rock shafts disposed transversely to the actuators and equal in number to the number of latches and operatively connected to trip the respective latches; a stop shoulder upon each actuator; and an arm extending from each rock shaft and adapted to coöperate with the respective stop shoulders.

116. In a typebar machine, the combination of mechanism adapted to intermittingly and spatially move a typebar lengthwise; and mechanism adapted to move a typebar lengthwise, by a continuous movement, through a space equal to its length.

117. In a typebar machine, the combination of a first galley adapted to hold typebar blanks; mechanism adapted to transfer a typebar by intermittent spatial movements, from said first galley into a second galley; said second galley; and mechanism adapted to transfer a typebar from said first galley into said second galley by a continuous movement.

118. In a typebar machine, the combination of a first galley adapted to hold typebar blanks; mechanism adapted to transfer a typebar by intermittent spatial movements, from said first galley into a second galley; said second galley; and manipulatively engageable mechanism adapted to transfer a typebar from said first galley into said second galley by a continuous movement.

119. In a typebar machine, the combination of an intermittently rotatable member; a plurality of intermittently and variably orbitally rotatable members mounted thereon; a spacing member mounted on one of said orbitally rotatable members; roughing or blocking-out dies mounted on one of said orbitally rotatable members; and finishing dies mounted on one of said orbitally rotatable members.

120. In a typebar machine, the combination of a plurality of intermittently and variably orbitally rotatable members; a spacing device, a roughing die and a finishing die, severally mounted on said orbitally rotatable members, respectively, and severally operatable by means engageable by a latch; said latch, forming a part of a plurality of latches; and said plurality of latches.

121. In a typebar machine, the combination of a plurality of intermittently and variably orbitally rotatable members; variably operative devices severally mounted thereon, respectively, and severally operatable by means engageable, in common, by a latch; and said latch.

122. In a typebar machine, the combination of a plurality of intermittently and variably orbitally rotatable members; variably operative devices severally mounted thereon, respectively, and severally operatable by means engageable, in common, by a latch; said latch forming a part of a plurality of latches; and said plurality of latches.

123. The combination with selective type making mechanism adapted to make types step by step along the edge of a blank, of a typebar-blank galley; an assembling galley; feed mechanism adapted to effect a feed movement of the blank in consonance with the line space value of the selected characters; mechanism for transferring the blank when provided with its complement of types into the assembling galley and means therein to receive and retain said blanks.

124. The combination with a selective typemaking mechanism adapted to make types step by step along the edge of a blank of a typebar-blank galley; an assembling galley; a displacer for shifting the last formed typebar out of the path of the advancing typebar; means to hold the same in such shifted position feed mechanism adapted to effect a feed movement of the blank in consonance with the line space value of the selected characters; and mechanism for transferring the blank when provided with its complement of types into the assembling galley.

125. The combination with a number of dies, of a carrier therefor; means to impart orbital movement thereto; latches to position the dies and arranged about the orbit of said carrier; and sector shaped actuators for said latches shiftable in a path concentric with the axis of said orbit.

126. The combination with a number of dies, of a carrier therefor; means to impart orbital movement thereto; latches to position the dies and arranged about the orbit of said carrier; sector shaped actuators for said latches shiftable in paths concentric to the axis of said orbit, and a series of transmitters mounted upon rock shafts disposed parallel to said orbital axis and adapted to transmit movement from said actuators to the latches.

127. The combination with a number of type-making dies, of a plurality of carriers therefor; roughing-out dies, a carrier therefor; a universal carrier for the same and adapted to impart orbital movement thereto; means to rotate the individual carriers; means to inaugurate such rotation; latches to engage the individual carriers, actuators therefor; said sector shaped actuators shiftable in paths concentric to the axis of said orbit; rock shafts arranged in positions forming an arc concentric to such orbital axis; fingers upon said rock shafts to be engaged by the actuators, and fingers to engage the latches; and means to shift said actuators.

128. The combination with type forming mechanism embodying type dies, of a blank bar galley at the working point of the said mechanism, an assembling galley, means to shift the bars from the blank galley to the assembling galley, and sector shaped actuators to selectively control the type dies.

129. The combination with means for forming a type on a type-bar blank, of means for imparting a movement to the blank, a typebar-blank galley, an assembling galley; and mechanism independent of said feeding means for transferring a blank from the typebar-blank galley to the assembling galley.

130. The combination with means for forming a type on a typebar-blank, of means for imparting a feed movement to the blank, a typebar-blank galley, an assembling galley, and mechanism independent of said feeding means under the control of the operator for transferring a blank in the typebar-blank galley to the assembling galley.

131. The combination with rotatable die carriers, of roughing out dies mounted upon one and finishing dies mounted upon the other carrier, a turret upon which said die carriers are mounted, an actuator for each of said die carriers, a plurality of latches lying in different planes, and a series of intervening transmitters one for each of said latches whereby the actuator may be connected with any latch for selecting a desired finishing die and its proper roughing out die and for causing the selected dies to successively operate on a type blank portion of a typebar blank, means for holding a series of blank bars, means for holding a series of finished bars, and means for transferring a worked upon bar from one to the other of these.

132. The combination with a pair of die carriers, roughing out dies mounted upon one and finishing dies upon the other of these, means for selectively bringing these into working position, a typebar blank galley adjacent to the working position, means for feeding the worked upon blank through said galley, an assembling galley, and mechanism independent of said feed mechanism for transferring the worked upon blank from the blank galley to the assembling galley.

133. The combination with a series of roughing and a series of finishing type dies, of feeding means for imparting a step by step movement to a blank, a typebar blank galley, an assembling galley, and means independent of the feeding means for transferring a worked upon blank from the typebar blank galley to the assembling galley.

134. The combination with a typebar-blank galley, of an assembling galley, type-making mechanism having its working point between said galleys and effective for forming types in succession on a blank, and mechanism for transferring the bars from the typebar-blank galley to the assembling galley past the working point of said type-making mechanism.

135. The combination with a typebar-blank galley, of an assembling galley, mechanism for forming types in succession on a blank and having its working point between said galleys, and mechanism for transferring the worked-upon typebars from one position to another relatively to the type making mechanism and the galleys.

FRANCIS H. RICHARDS.

Witnesses:
   FRED. J. DOLE,
   C. E. VOSS.